United States Patent
Mie et al.

(10) Patent No.: US 8,873,404 B2
(45) Date of Patent: Oct. 28, 2014

(54) NODE DEVICE, COMMUNICATION METHOD, STORAGE MEDIUM, AND NETWORK SYSTEM

(71) Applicant: Fujitsu Limited, Kawasaki (JP)

(72) Inventors: Koki Mie, Fukuoka (JP); Katsuhiko Yamatsu, Fukuoka (JP); Yuji Higashihara, Fukuoka (JP); Masahiro Hayashi, Fukuoka (JP); Yuichi Inao, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/187,408

(22) Filed: Feb. 24, 2014

(65) Prior Publication Data

US 2014/0269344 A1    Sep. 18, 2014

(30) Foreign Application Priority Data

Mar. 18, 2013  (JP) .................................. 2013-054875

(51) Int. Cl.
  *H04L 1/00*  (2006.01)
  *H04L 12/26*  (2006.01)
(52) U.S. Cl.
  CPC .................................. *H04L 43/0847* (2013.01)
  USPC ....................................................... 370/242
(58) Field of Classification Search
  USPC ....................................................... 370/242
  See application file for complete search history.

(56) References Cited

U.S. PATENT DOCUMENTS

| | | | | |
|---|---|---|---|---|
| 2004/0047300 | A1* | 3/2004 | Enomoto et al. | 370/256 |
| 2008/0232384 | A1* | 9/2008 | Miyabe | 370/401 |
| 2009/0073874 | A1* | 3/2009 | Maruyoshi et al. | 370/225 |
| 2009/0196188 | A1* | 8/2009 | Takeyoshi et al. | 370/242 |
| 2011/0228682 | A1* | 9/2011 | Enomoto et al. | 370/244 |
| 2013/0021945 | A1* | 1/2013 | Yura et al. | 370/254 |
| 2013/0201868 | A1* | 8/2013 | Ghosh et al. | 370/254 |

FOREIGN PATENT DOCUMENTS

JP    2001-136178    5/2001

* cited by examiner

*Primary Examiner* — Clemence Han
(74) *Attorney, Agent, or Firm* — Fujitsu Patent Center

(57) ABSTRACT

Anode device includes a transmitter and a processor. The transmitter transmits an inspection frame used in inspecting a status of a route from a source node device to a destination node device. The processor generates a first inspection frame and selects a first node device to which the transmitter transmits the first inspection frame from among candidates for a node device to which a frame addressed to the destination node device is to be forwarded. The processor judges whether a transmission of the first inspection frame has been successfully performed. When the transmission of the first inspection frame has failed, the processor generates a second inspection frame which records a failure in a communication with the first node device. The processor selects a second node device to which the transmitter transmits the second inspection frame from among the candidates.

9 Claims, 23 Drawing Sheets

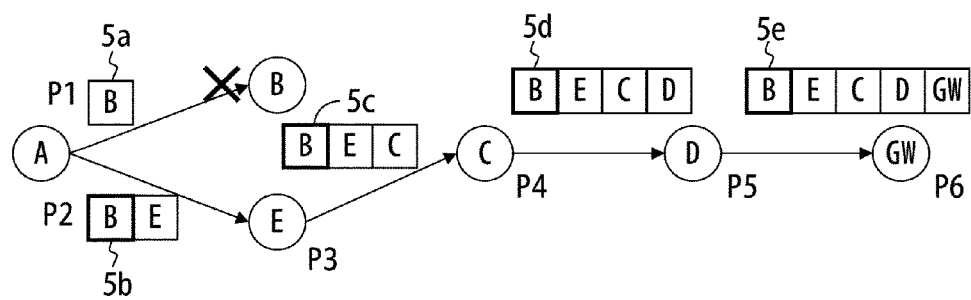
F I G. 1

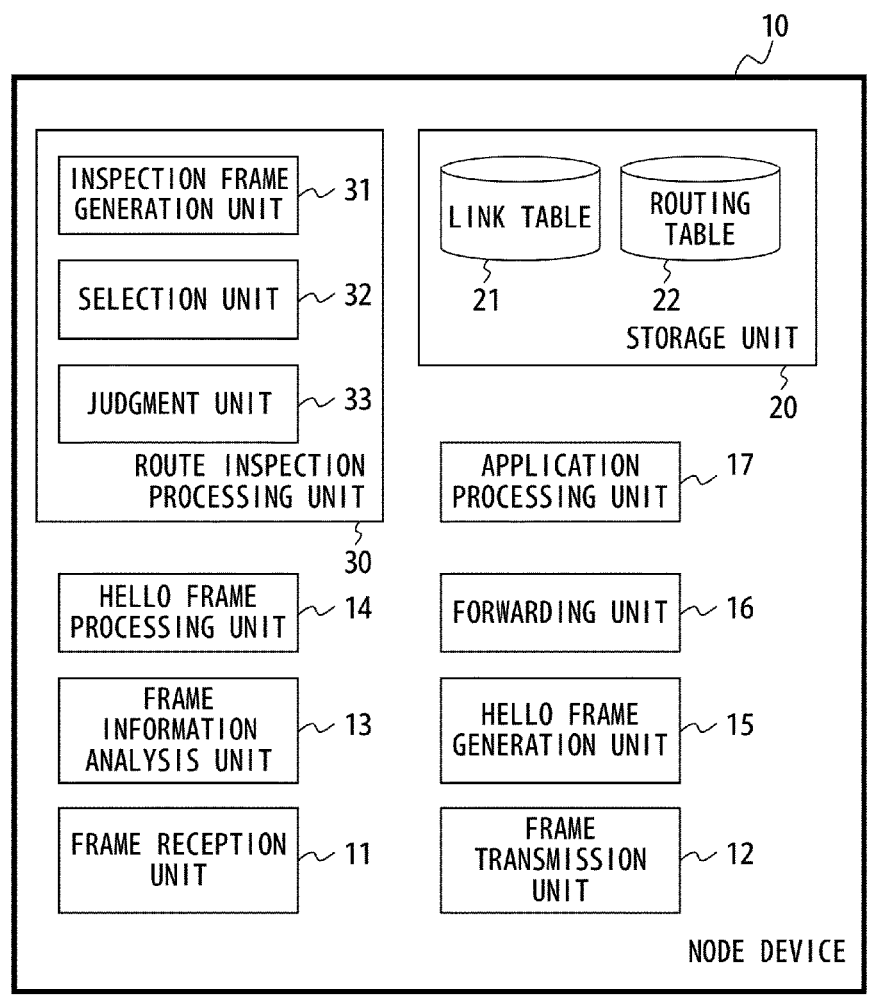
F I G. 2

| No. | LS OF Hello FRAME | Hello RECEPTION INTENSITY | | COMMUNICATION QUALITY EVALUATION | FREQUENCY OF RETRANSMISSION |
|---|---|---|---|---|---|
| | | MEAN | VARIANCE | | |
| 1 | GW | Igw | sgw1 | GOOD | |

21f

| No. | LS OF Hello FRAME | Hello RECEPTION INTENSITY | | COMMUNICATION QUALITY EVALUATION | FREQUENCY OF RETRANSMISSION |
|---|---|---|---|---|---|
| | | MEAN | VARIANCE | | |
| 1 | B | Ib | sb1 | BAD | rb |
| 2 | E | Ie | se1 | GOOD | re |

21a

Hello RECEPTION INTENSITY columns (second set):
- Row 1: MEAN Eb, VARIANCE sb2
- Row 2: MEAN Ee, VARIANCE se2

Hello RECEPTION INTENSITY columns (first table, second pair):
- Row 1: MEAN Egw, VARIANCE sgw2

F I G. 5

| No. | GD | LD | QUALITY INFORMATION |
|---|---|---|---|
| 1-1 | GW | GW | Vgw |
| 1-2 | | | |
| 1-3 | | | |
| ⋮ | ⋮ | ⋮ | ⋮ |

~ 22f

| No. | GD | LD | QUALITY INFORMATION |
|---|---|---|---|
| 1-1 | GW | GW | Vgw |
| 1-2 | | F | Vf1 |
| 1-3 | | | |
| 2-1 | F | F | Vf2 |
| 2-2 | | | |
| 2-3 | | | |
| ⋮ | ⋮ | ⋮ | ⋮ |

~ 22h

| No. | GD | LD | QUALITY INFORMATION |
|---|---|---|---|
| 1-1 | GW | B | Vb |
| 1-2 | | E | Ve |
| | | | |
| ⋮ | ⋮ | ⋮ | ⋮ |

~ 22a

F I G. 6

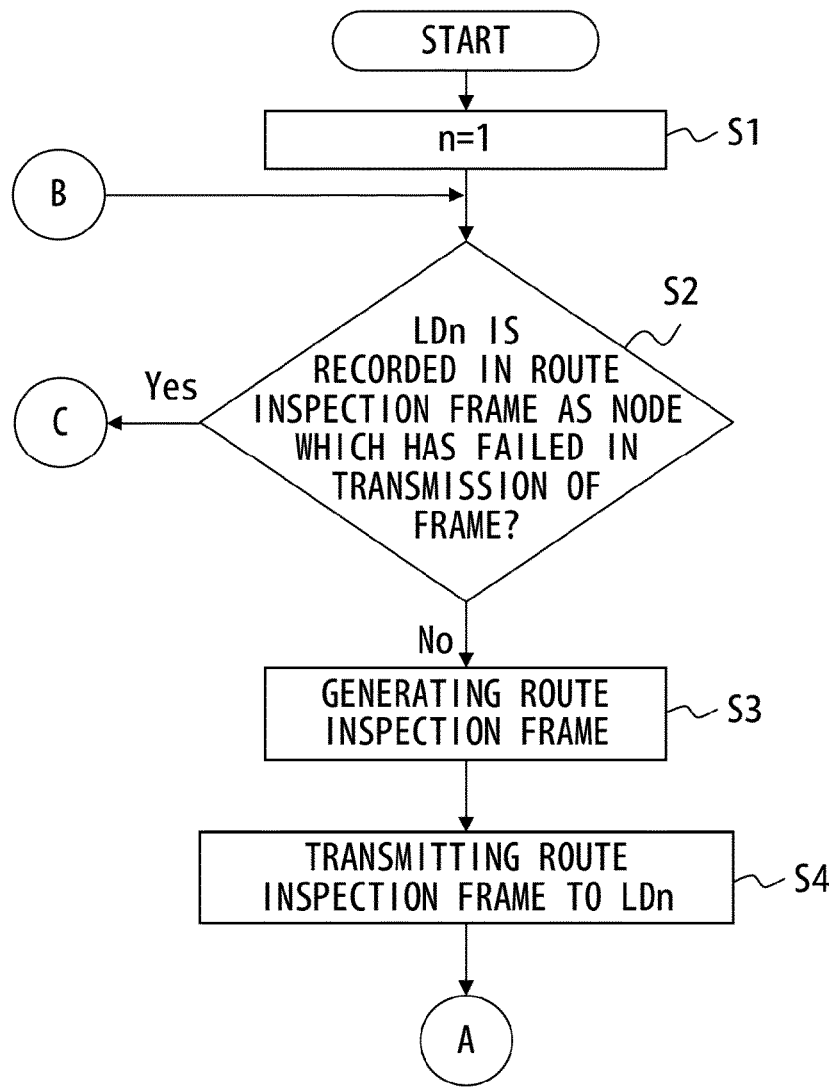
F I G. 1 1 A

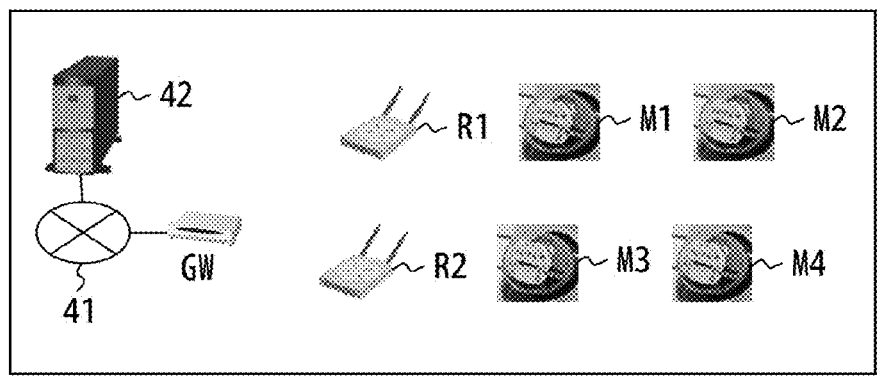
F I G. 1 2

A1

| M1 | R1 | GW |
|---|---|---|
| MEDIUM | MEDIUM | GOOD |
| OK | OK | OK |
| HOP #1 | HOP #2 | HOP #3 |

A2

| M1 | M2 | M1 | R1 | GW |
|---|---|---|---|---|
| MEDIUM | MEDIUM | GOOD | MEDIUM | GOOD |
| NG | OK | OK | OK | OK |
| HOP #1 | HOP #2 | HOP #3 | HOP #4 | HOP #5 |

A3

| M1 | M2 | M3 | M2 | M1 |
|---|---|---|---|---|
| MEDIUM | MEDIUM | BAD | GOOD | GOOD |
| NG | NG | OK | OK | OK |
| HOP #1 | HOP #2 | HOP #3 | HOP #4 | HOP #5 |

| R1 | GW |
|---|---|
| MEDIUM | GOOD |
| OK | OK |
| HOP #6 | HOP #7 |

F I G. 13

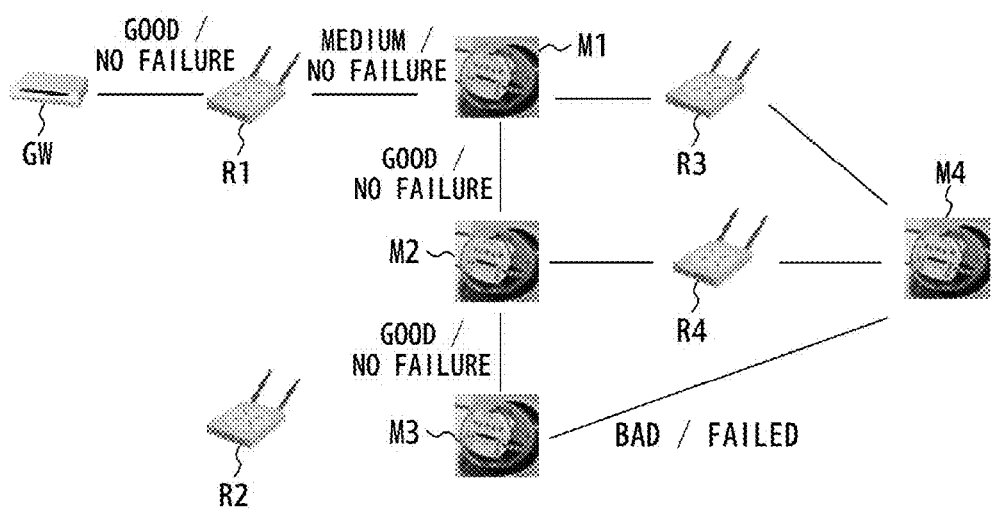
F I G. 1 5

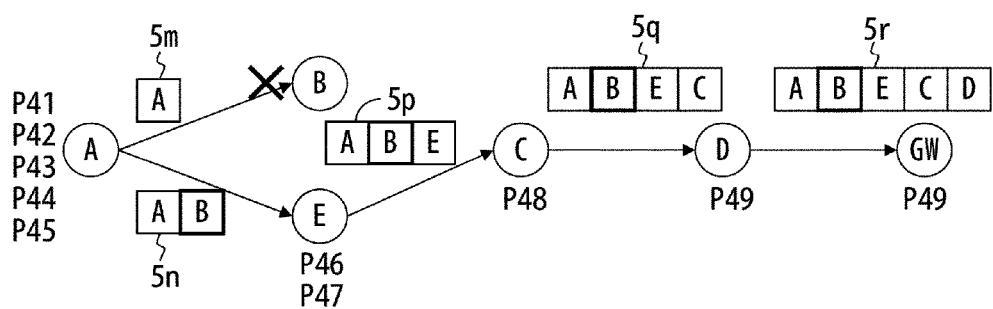
F I G. 17

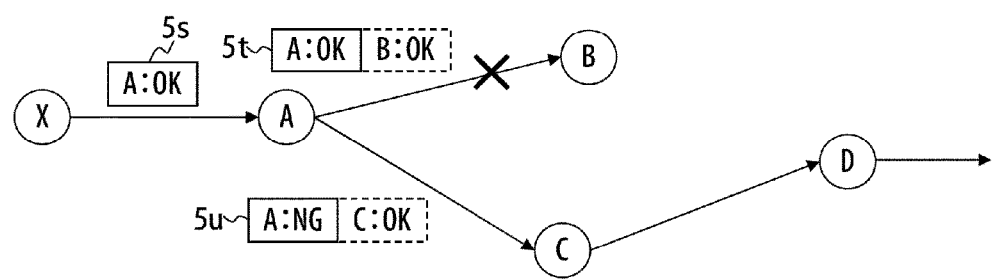
F I G. 1 8

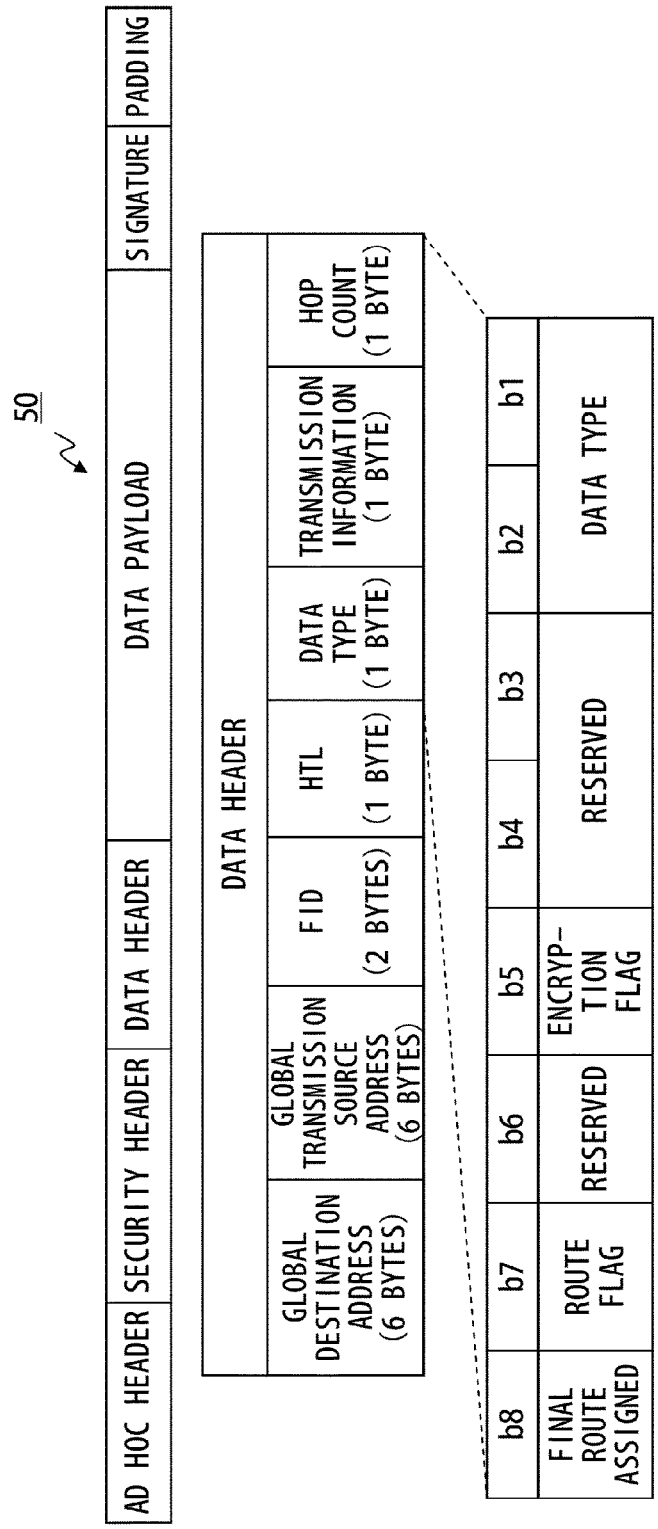
F I G. 19

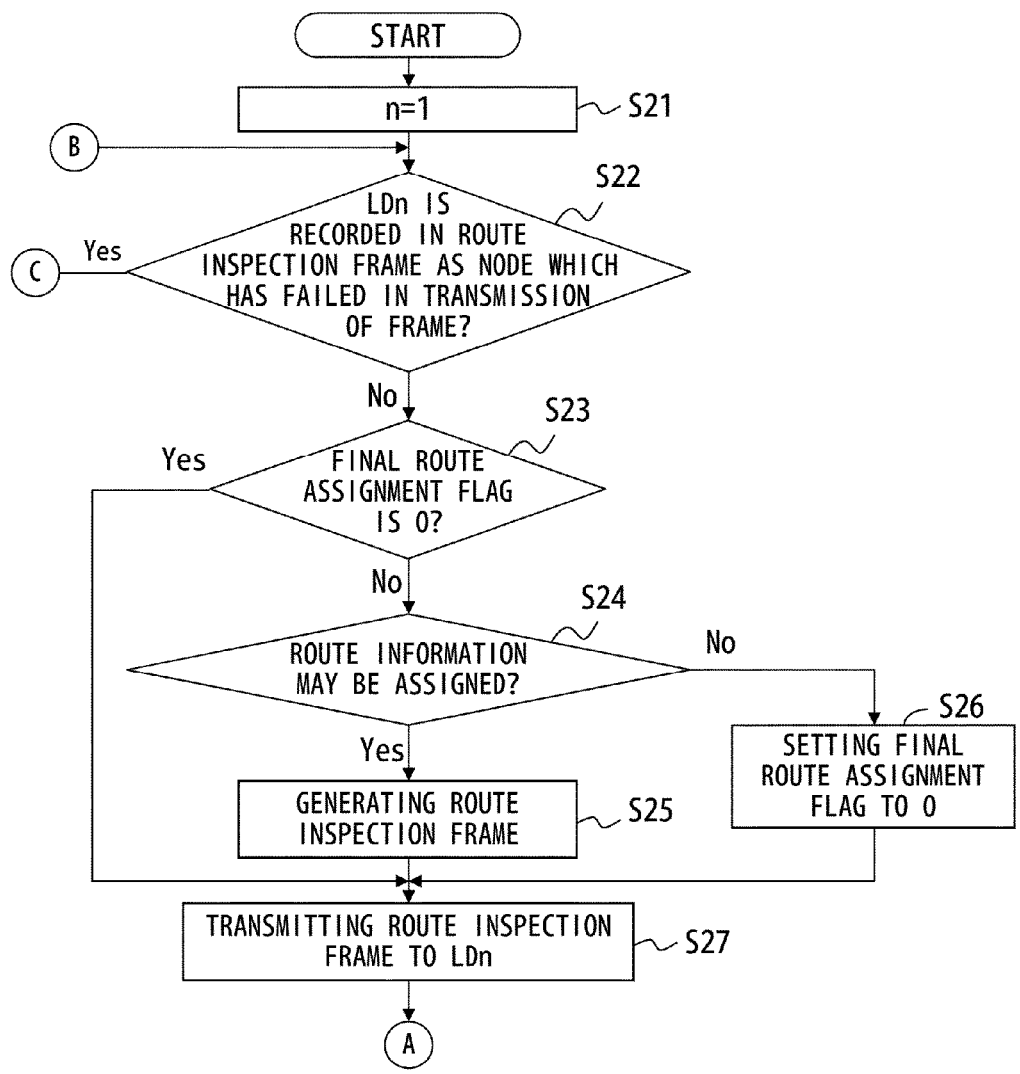
F I G. 2 1 A

NODE DEVICE, COMMUNICATION METHOD, STORAGE MEDIUM, AND NETWORK SYSTEM

CROSS-REFERENCE TO RELATED APPLICATIONS

This application is based upon and claims the benefit of priority of the prior Japanese Patent Application No. 2013-054875, filed on Mar. 18, 2013, the entire contents of which are incorporated herein by reference.

FIELD

The embodiments discussed herein are related to a communication performed over a network including a plurality of node devices.

BACKGROUND

An ad hoc network is convenient because a network is dynamically configured although a node device which forms the network is added or deleted. The node device which is added to the ad hoc network may dynamically form a network by communicating a Hello frame with another node device. The Hello frame includes the information about a source node device of the Hello frame. The Hello frame further includes an identifier of a destination node device and quality information about a route from the source node device to the destination node device for each determination to which a frame may be forwarded from the source node device. The node device acquires a route to another node device in the ad hoc network using the information communicated through a Hello frame.

As a well-known related technology, there is a route control method for transmitting a route inspection frame to a plurality of routes to a destination from a wireless communication control device as a source of data. The source determines a route first received by the destination, a route of a lower retrial frequency, or a route of a lower circuit load as a route to be used in transmitting data.

There are some well-known documents such as Japanese Laid-open Patent Publication No. 2001-136178 etc.

SUMMARY

According to an aspect of the embodiments, a node device is provided. The node device includes a transmitter and a processor.

The transmitter transmits an inspection frame used in inspecting a status of a route from a source node device of data to a destination node device of the data.

The processor generates a first inspection frame used in inspecting the state of the route. The processor selects a first node device to which the transmitter transmits the first inspection frame from among candidates for a node device to which a frame addressed to the destination node device is to be forwarded. The processor judges whether or not a transmission of the first inspection frame has been successfully performed. When the transmission of the first inspection frame from the transmitter has failed, the processor generates a second inspection frame which records a failure in a communication with the first node device and which is used in inspecting the state of the route. And the processor selects a second node device to which the transmitter transmits the second inspection frame from among the candidates.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an example of a communication method according to an embodiment of the present invention;
FIG. 2 is an example of a configuration of a node device;
FIG. 5 is an example of a link table;
FIG. 6 is an example of a routing table;
FIGS. 11A and 11B are flowcharts for explanation of an example of an operation of a node device;
FIG. 12 is an example of information which may be acquired for a network before an analysis;
FIG. 13 is an example of route information input to a server;
FIG. 15 is an example of changing a network;
FIG. 17 is an example of a transmitting process performed according to the third embodiment of the present invention;
FIG. 18 is an explanatory view of an example of a case in which route information is erroneously amended;
FIG. 19 is an example of a format of a route inspection frame;
FIGS. 21A and 21B are flowcharts for explanation of an example of an operation of a node device according to the fourth embodiment.

DESCRIPTION OF EMBODIMENTS

Figure 3:
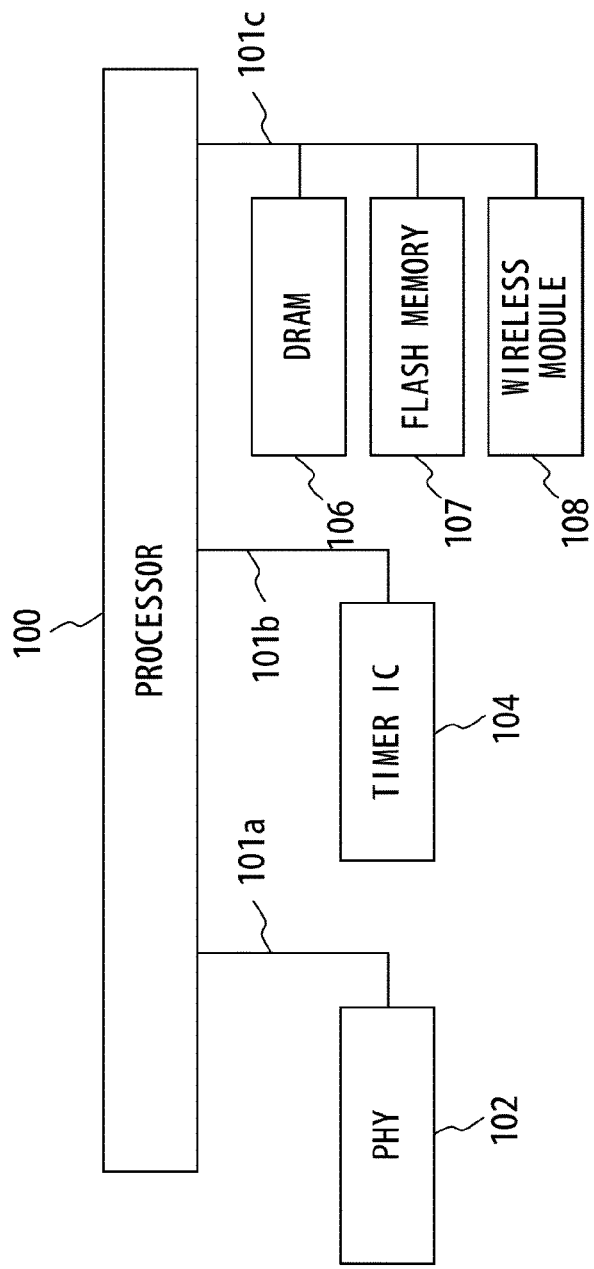
FIG. 3 is an example of a configuration of hardware of a node device.

In an ad hoc network in a wireless communication, the state of communications may fluctuate between node devices depending on the locations of the installed node devices, the state of peripheral radio waves of the node devices, etc. Therefore, although a route is established, the communication may be unable to be stably performed by a change in the environment of the node devices. The wireless communication control device described in the background above may acquire the communication quality for each route at the time of evaluation, but is unable to acquire data for judgment as to whether or not astable communication may be performed in each route.

An aspect of the embodiment described below aims at more correctly (and/or more simply) monitoring the state of a communication route in a network.

FIG. 1 is an example of a communication method according to an embodiment of the present invention. FIG. 1 is an example of an ad hoc network in which six node devices of nodes A through E and a gateway device (hereafter referred to as a "GW" for short) participate.

A node device communicates a frame with an adjacent node device. A node device adjacent to a certain node device refers to a node device which is located in a range in which the node device may receive a frame transmitted from the certain node device. A node device located in a range in which the node device may receive a frame transmitted from a certain node device may be described ad an "adjacent node device" to the certain node device. For example, in FIG. 1, adjacent nodes to the node A are the node B and the node E.

When an ad hoc network is formed, the route between the two node devices in the ad hoc network may be inspected using a route inspection frame. An example of a method for inspecting the state of a route from the node A toward the GW is explained below with reference to FIG. 1.

In the procedure P1, the node A transmits a route inspection frame 5a to the node B. The node A generates the route inspection frame 5a by assuming that a communication with the node B is successfully performed. Therefore, the route inspection frame 5a includes the information indicating that the communication from the node A to the node B has been successfully performed. In this case, assume that an inspection frame does not reach the node B by the degraded state of the link between the node A and the node B.

The procedure P2 is performed as follows. When the node A does not receive in a specified time period an acknowledgment (hereafter referred to as "Ack" for short) from the node B to the route inspection frame 5a, it is judged that the transmission of a frame to the node B has failed. Then, the node A transmits a route inspection frame 5b to the node E. The route inspection frame 5b includes the information that the transmission from the node A to the node B has failed, and the information that the communication from the node A to the node E has been successfully performed.

In the example in FIG. 1, the information about the link when a communication has failed is indicated by bold lines. Furthermore, the information about the link is indicated by a square including the identifier of a node device as the destination of a route inspection frame in the link. For example, the square including "E" in the route inspection frame 5b indicates the information about the successful transmission from the node A to the node E and the information about the link between the node A and the node E. Hereafter, the route inspection frames 5a and 5b may be referred to by the reference numeral of "5" inclusively.

The procedure P3 is performed as follows. Upon receipt of the route inspection frame 5b from the node A, the node E transmits the Ack about the route inspection frame 5b to the node A. Furthermore, the node E transmits a route inspection frame 5c to the node C. The route inspection frame 5c includes the information that the communication using the link between the node A and the node E may be performed, the transmission has been successfully performed between the node E and the node C, and the transmission has failed between the node A and the node B.

The procedure P4 is performed as follows. Upon receipt of the route inspection frame 5c from the node E, the node C performs a process similar to the process performed by the node E. Therefore, as illustrated in FIG. 1, the node C transmits a route inspection frame 5d to the node D. The route inspection frame 5d includes the information that the route which is originated from the node A and passes through the node E, the node C, and the node D is available, and the transmission between the node A and the node B has failed. The node C transmits an Ack about the route inspection frame 5c to the node E.

The procedure P5 is performed as follows. Upon receipt of the route inspection frame 5d from the node C, the node D performs a process similar to the process performed by the node E. Therefore, as illustrated in FIG. 1, the node D transmits a route inspection frame 5e to the GW. The route inspection frame 5e includes the information that the route which is originated from the node A and reaches the GW through the node E, the node C, and the node D is available, and the transmission between the node A and the node B has failed. The node D transmits the Ack about the route inspection frame 5d to the node C.

The procedure P6 is performed as follows. Upon receipt of the route inspection frame 5e, the GW transmits the information included in the route inspection frame 5e to a server. The GW also transmits the Ack about the route inspection frame 5e to the node D.

The procedure P7 (not illustrated in FIG. 1) is performed as follows. According to the information received from the GW, an operator who is performing a process on a server acquires the information about the state of each link included in the route from the node A to the GW. In the server, a network topology is analyzed according to the information notified from the GW.

Thus, in the method according to the embodiment, the information which identifies the link in which a communication has failed is notified to the GW through the destination node device of the route inspection frame 5. The GW transmits to the server the route information including the information about the identification of a link through which the communication has failed. Therefore, the operator may obtain the network topology including the link in which the communication has failed.

The operator may check the installation of a new node device etc. and the location where the display is installed according to the topology information obtained as a result of the analysis. For example, in the network illustrated in FIG. 1, the operator may check the installation of a new node X between the node A and the node B to improve the state of communications between the node A and the node B. Furthermore, using the method of inspecting a route according to the embodiment of the present invention, the degradation of the state of a link may be found out at an early stage. Therefore, an ad hoc network may be easily maintained Configuration of Device FIG. 2 is an example of a configuration of a node device 10. The node device 10 includes a frame reception unit 11, a frame transmission unit 12, a frame information analysis unit 13, a Hello frame processing unit 14, a Hello frame generation unit 15, a forwarding unit 16, and an application processing unit 17. The node device 10 further includes a storage unit 20 and a route inspection processing unit 30. The storage unit 20 holds a link table 21 and a routing table 22. The route inspection processing unit 30 includes an inspection frame generation unit 31, a selection unit 32, and a judgment unit 33.

The frame reception unit 11 receives a frame transmitted to the node device 10. The frame reception unit 11 outputs the received frame to the frame information analysis unit 13. On the other hand, the frame transmission unit 12 transmits the frame input by the Hello frame generation unit 15, the forwarding unit 16, the inspection frame generation unit 31, etc. to the local destination of the frame.

The "local destination" (hereafter referred to as an "LD" for short) refers to a node device specified as a destination for forwarding a frame by one hop to transmit the frame to the final destination. Furthermore, the final destination of a frame may be described as a "global destination" (hereafter referred to as a "GD" for short).

The node device 10 which has generated a frame may be described as a "global transmission source" (hereafter referred to as a "GS" for short). The source node device 10 when a frame is forwarded by one hop may be described as a "local transmission source" (hereafter referred to as an "LS" for short).

The frame information analysis unit 13 confirms the type field in the ad hoc header included in the input frame. The value of the type field depends on the type of frame. For example, a Hello frame and a data frame have different values of type fields.

The frame information analysis unit 13 may store in advance the value of the type field corresponding to each type of frame which may be received by the node device 10, and may also appropriately acquire the value from the storage unit 20. The frame information analysis unit 13 outputs a Hello frame to the Hello frame processing unit 14.

The frame information analysis unit 13 judges for a data frame whether or not the data frame is the route inspection frame 5. The frame information analysis unit 13 outputs the route inspection frame 5 to the judgment unit 33.

The Hello frame processing unit 14 stores the information acquired from the Hello frame in the link table 21 and the routing table 22.

The Hello frame processing unit 14 calculates the communication quality of a link and the quality of a route using the reception intensity etc. of a Hello frame. The Hello frame processing unit 14 stores the information about an adjacent node device and the communication quality of a link in the link table 21.

On the other hand, the Hello frame processing unit 14 stores in the routing table 22 the information about a route in a network and the information about the quality of a route. Furthermore, the Hello frame processing unit 14 stores the node device to which a frame is forwarded (that is, the local destination) after associating the node device with the node device of the global destination of the frame.

Examples, uses, etc. of the link table 21 and the routing table 22 are described later.

The Hello frame generation unit 15 generates a Hello frame at specified intervals, and outputs the frame to the frame transmission unit 12.

The forwarding unit 16 generates a local destination according to the global destination of the frame input from the application processing unit 17 etc., and generates an ad hoc header. The format of a frame is described later.

The forwarding unit 16 refers to the routing table 22 when a local destination is determined. The forwarding unit 16 outputs to the frame transmission unit 12 a frame to which the ad hoc header is added.

The application processing unit 17 processes the frame input from the frame information analysis unit 13.

The inspection frame generation unit 31 notifies the selection unit 32 of the global destination of the route inspection frame 5. The selection unit 32 refers to the routing table 22, thereby determining the node device specified as a local destination in the route inspection frame 5 from the candidates for the local destination associated with the notified global destination.

The inspection frame generation unit 31 generates the 5 with the node device notified by the selection unit 32 set as a local destination. The inspection frame generation unit 31 outputs the route inspection frame 5 to the frame transmission unit 12.

The judgment unit 33 acquires the route inspection frame 5 and the Ack for the route inspection frame 5 from the frame information analysis unit 13. When the route inspection frame 5 is input from the frame information analysis unit 13, the judgment unit 33 judges whether or not the node device specified as a global destination of the route inspection frame 5 is the local node (that is, the node device 10 itself). If the node device specified as the global destination is not the node device 10 itself, then the judgment unit 33 notifies the inspection frame generation unit 31 of the reception of the route inspection frame 5, and the global destination of the route inspection frame 5.

Using the Ack for the route inspection frame 5, the judgment unit 33 judges whether or not the transmission of the route inspection frame 5 has been successfully performed. For example, if the judgment unit 33 receives the Ack for the route inspection frame 5 within a specified time period after the transmission time of the route inspection frame 5, the judgment unit 33 judges that the transmission has been successfully performed. On the other hand, unless the judgment unit 33 receives the Ack for the route inspection frame 5 within a specified time period after the transmission time of the route inspection frame 5, the judgment unit 33 judges that the transmission has failed. The judgment unit 33 notifies the selection unit 32 of the failure of the transmission of the route inspection frame 5, and the global destination of the route inspection frame 5.

Then, the selection unit 32 refers to the routing table 22, and selects the node device other than the node device which was unable to transmit the route inspection frame 5 as a local destination of the route inspection frame 5. The selection unit 32 notifies the inspection frame generation unit 31 of the failure of the transmission of the route inspection frame 5, and the information about the specification of a newly determined node as a local destination of the route inspection frame 5.

The inspection frame generation unit 31 generates a new route inspection frame 5 with the node device notified from the selection unit 32 set as a local destination. In this case, the inspection frame generation unit 31 includes in the new route inspection frame 5 the information for specification of a local destination for which the transmission has failed.

FIG. 3 is an example of a configuration of the hardware of the node device 10. The node device 10 includes a processor 100, a bus 101 (that is, buses 101a through 101c), a timer IC 104, dynamic random access memory (DRAM) 106, flash memory 107, and a wireless module 108. The node device 10 may optionally include a PHY chip 102. The buses 101a through 101c connect the processor 100, the PHY chip 102, the timer IC 104, the DRAM 106, the flash memory 107, and the wireless module 108 so that the input and the output of data may be performed among the components.

The processor 100 is an optional processing circuit such as a micro-processing unit (MPU) etc. The processor 100 performs a process by reading a program such as firmware etc. stored in the flash memory 107. In this case, the processor 100 may use the DRAM 106 as working memory.

In the node device 10, the processor 100 operates as the frame information analysis unit 13, the Hello frame processing unit 14, the Hello frame generation unit 15, the forwarding unit 16, the application processing unit 17, and the route inspection processing unit 30. In the node device 10, the DRAM 106 operates as the storage unit 20, and holds the link table 21 and the routing table 22.

In the node device 10, the wireless module 108 operates as the frame reception unit 11 and the frame transmission unit 12. The PHY chip 102 is used in a cable communication. The node device 10 which operates as a gateway for relaying the communication between a device in an ad hoc network and a device in another network may perform a communication using a circuit through the PHY chip 102.

The timer IC 104 is used in measuring the interval of transmitting a Hello frame, the interval of receiving a Hello frame from an adjacent node device 10, the time interval from the transmission of the route inspection frame 5 to the reception of an Ack, etc. That is, the timer IC 104 operates as a part of the Hello frame processing unit 14, the application processing unit 17, the judgment unit 33, etc. Furthermore, in the system in which the node device 10 is set to report to the GW the state of the route to the GW at specified intervals, the timer IC 104 operates as a part of the inspection frame generation unit 31, and measures the time interval of generating the route inspection frame 5.

A program such as firmware etc. is provided as stored in a non-transitory and computer-readable storage medium, and may be installed on the node device 10. The program may also be installed on the node device 10 after being downloaded from a network through the PHY chip 102 and the wireless module 108. Furthermore, depending on the embodiments, a storage device of a type other than the DRAM 106 and the flash memory 107 may be used. In addition, the node device 10 may be realized by a computer.

First Embodiment

The first embodiment is described below separately for the generation of an ad hoc network and the collection of route information. Furthermore, an example of a method of using obtained route information is also explained below.

In the explanation below, it is assumed that the GW is connected to a network 41, and may communicate with a server 42 through the network 41. In the description below, to clarify the node device 10 which performs an operation being explained, an alphabetic character assigned to the node device 10 which is performing the operation being explained may be added to the end of a reference numeral. For example, the inspection frame generation unit 31 in the node A may be expressed as a "inspection frame generation unit 31a", the Hello frame generation unit 15 in the GW may be expressed as a "Hello frame generation unit 15gw", etc.

Generation of Ad Hoc Network

Figure 4:
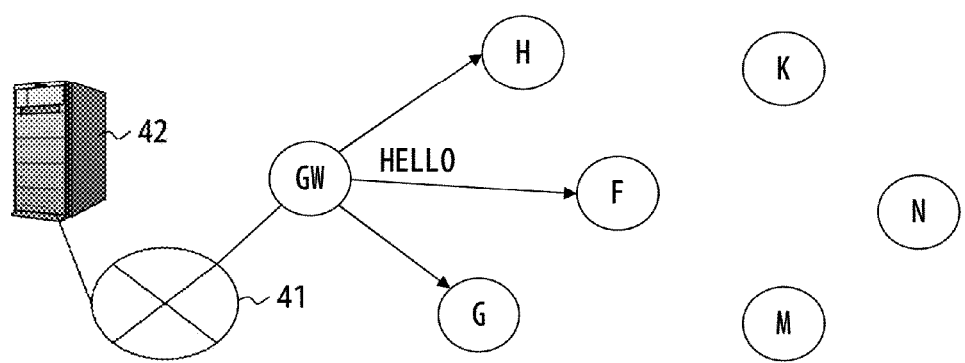
FIG. 4 is an explanatory view of a method of generating an ad hoc network.

FIG. 4 is an explanatory view of a method of generating an ad hoc network. Each node device 10 included in the ad hoc network forms an ad hoc network by communicating a Hello frame with the adjacent node device 10.

At the transmission time of a Hello frame, the application processing unit 17gw of the GW requests the Hello frame generation unit 15gw to generate a Hello frame. At the time point illustrated in FIG. 4, it is assumed that the GW does not communicate a Hello frame with any node device 10, and the GW does not recognize any node device 10.

The Hello frame generation unit 15gw transmits a Hello frame including the information about the GW to the adjacent node device 10 through the frame transmission unit 12gw. Therefore, as illustrated in FIG. 4, a Hello frame is transmitted to a node F, a node G, and a node H which are adjacent to the GW.

Next, the operation of the node device 10 which has received a Hello frame is explained below using the node F as an example. The frame reception unit 11f of the node F outputs the received Hello frame to the frame information analysis unit 13f. The frame information analysis unit 13f outputs the Hello frame to the Hello frame processing unit 14f using the value of the type field. The Hello frame processing unit 14f records the information about the source of the Hello frame and the information about the reception intensity etc. of the Hello frame in the link table 21f and the routing table 22f.

FIG. 5 is an example of the link table 21. In the example in FIG. 5, the link table 21 records the reception interval and the reception intensity of a Hello frame, the communication quality evaluation value about the link to the source of the Hello frame, and the frequency of the retransmission of a frame as associated with the source of the Hello frame. The reception interval and the reception intensity respectively includes a mean value and a variance value.

Upon receipt of the Hello frame from the GW, the node F generates a link table 21f illustrated in FIG. 5. In this case, the Hello frame processing unit 14f obtains a communication quality evaluation about the link between the GW and the node F.

The closer the correct value of the reception interval of the Hello frame is, the higher communication quality evaluation the Hello frame processing unit 14f assigns. The larger the reception intensity of the Hello frame is, the better the value of the communication quality evaluation is assigned. Furthermore, the smaller the variance value of the reception interval and the variance value of the reception intensity are, the better values of the communication quality evaluation the Hello frame processing unit 14f assigns. Furthermore, the smaller the variance values of the reception interval and the reception intensity of the Hello frame are, the better value of the communication quality evaluation the Hello frame processing unit 14f assigns.

Furthermore, the lower the frequency of the retransmission is, the better value of communication quality evaluation the Hello frame processing unit 14f assigns. The frequency of retransmission is the information about the frequency of retransmitting a data frame to the adjacent node device 10, and is recorded by the application processing unit 17 etc.

FIG. 6 is an example of the routing table 22. The routing table 22 may record an optional number (one or more) of local destinations. For example, as illustrated in FIG. 6, the routing table 22 may record not more than three local destinations for one global destination.

When a plurality of local destinations are associated with one global destination, the priority is expressed by a numeral subsequent to an LD. For example, the "LD1" refers to the node device 10 which is selected as the device to which data is forwarded on a priority basis in the local destinations.

Furthermore, the routing table 22 holds the information about the quality of a route calculated using, for example, the hop count of a route, the received wave intensity of each link included in the route, etc. for each combination of a global destination and a local destination. The method of calculating quality information is selected depending on the implementation.

For example, upon receipt of a Hello frame from the GW, the node F generates the routing table 22f illustrated in FIG. 6. Upon receipt of the Hello frame from the GW, the node G and the node H performs similar processing.

Figure 7:
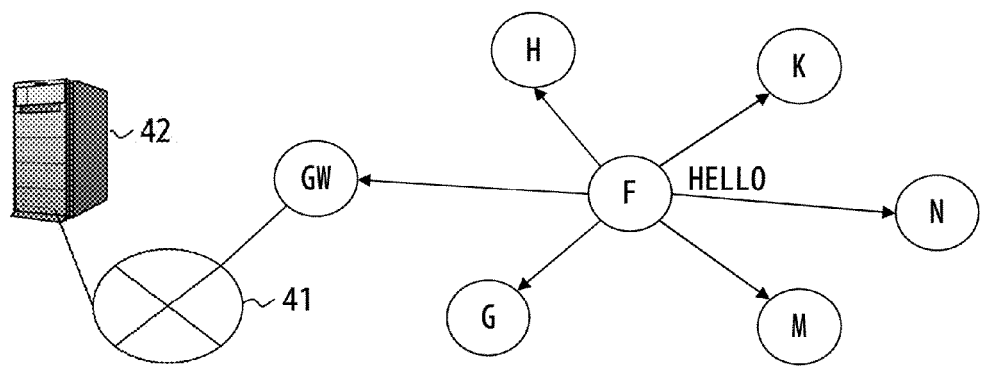
FIG. 7 is an explanatory view of a method of generating an ad hoc network.

Next, assume that the node F has transmitted a Hello frame as illustrated in FIG. 7. The generation of a Hello frame performed in the node F is similar to the process by the GW.

Since the node F transmits a Hello frame after receiving the Hello frame from the GW, the Hello frame generation unit 15f includes the information about the link table 21f and the routing table 22f in the Hello frame. Therefore, the Hello frame transmitted from the node F records that the node F may forward the frame to the GW.

Then, upon receipt of the Hello frame from the node F, each node device 10 records the node F as an adjacent node in the link table 21, and records in the routing table 22 that the frame may be transmitted to the GW through the node F. That is, upon receipt of a Hello frame from the node F, each node device 10 records in the routing table 22 the node F as the local destination of the information assigned the GW as the global destination. FIG. 6 illustrates the routing table 22h generated when the node H receives the Hello frame from the node F.

Figure 8:
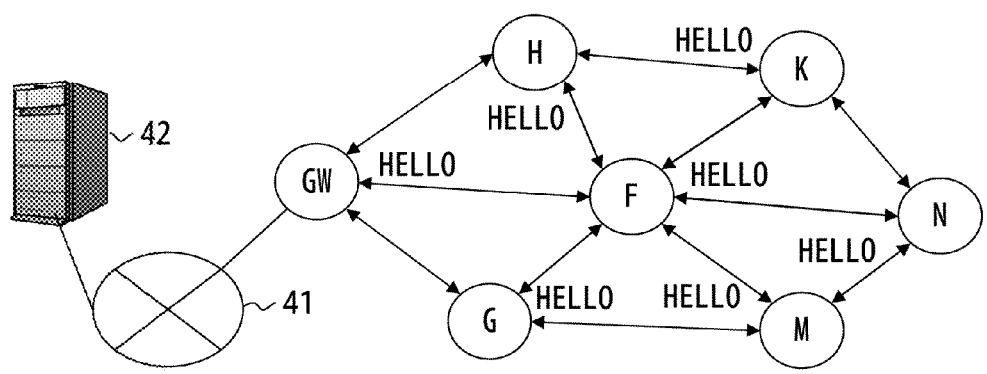
FIG. 8 is an example of an ad hoc network.

Thus, by each node device 10 communicating a Hello frame, each node device 10 in the ad hoc network acquires a route for a transmission of a frame to another node device 10. As a result, for example, the ad hoc network as illustrated in FIG. 8 is formed.

Collection of Route Information

Figure 9:
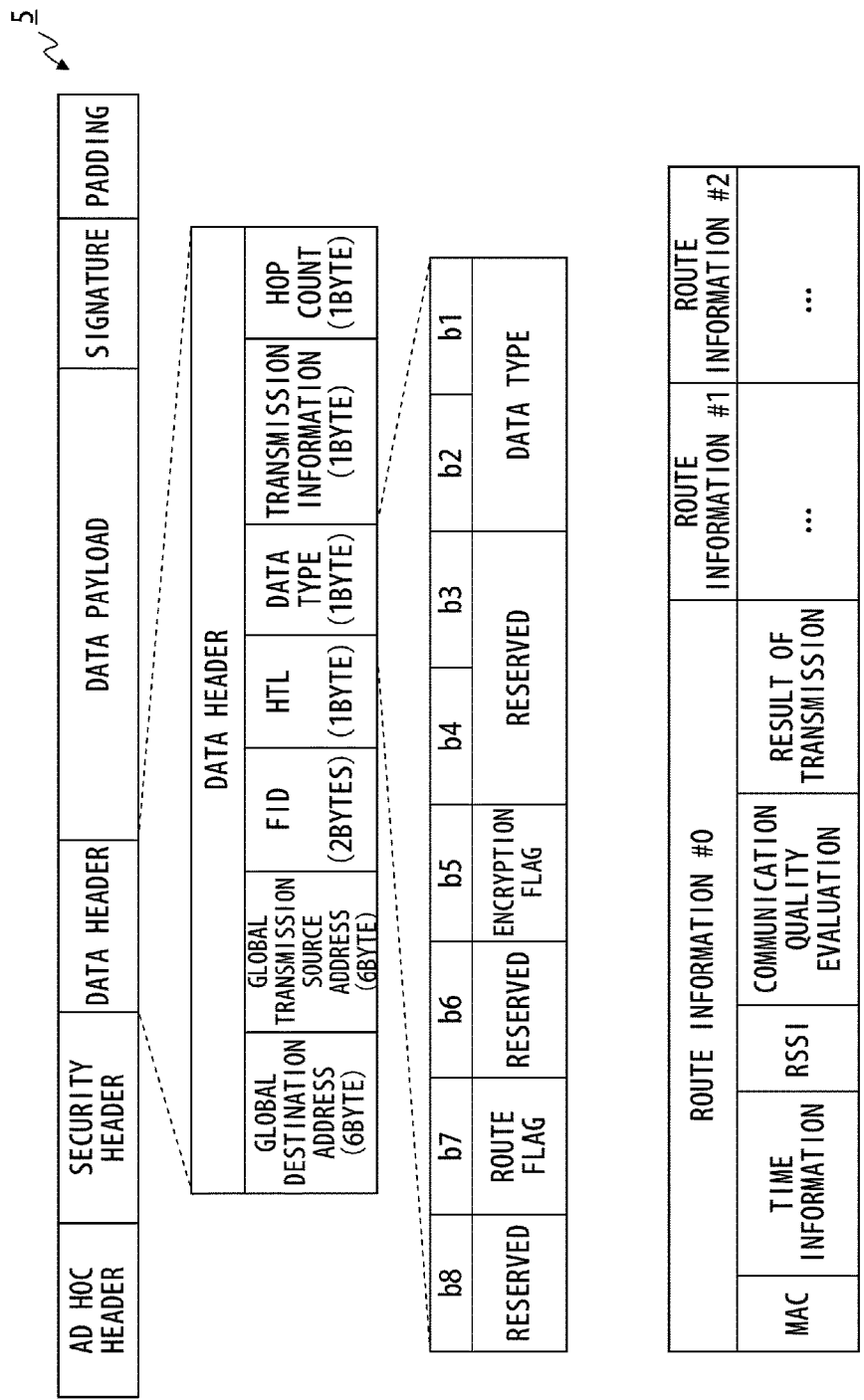
FIG. 9 is an example of a format of a route inspection frame.

FIG. 9 is an example of a format of the route inspection frame 5. Assume that the format of the route inspection frame 5 is similar to that of a data frame. The route inspection frame 5 includes an ad hoc header, a security header, a data header, a data payload, and a signature as illustrated in FIG. 9, and also includes a padding appropriately. The route information is included in the data payload.

The ad hoc header includes the information such as a local destination address, a local transmission source address, a type, a frame size, etc. The Hello frame also includes an ad hoc header, and the data frame and the Hello frame is identified by the value of the type. For example, in the data frame, the value of the type is set to 1, and in the Hello frame, the value of the type is set to 0.

The data header includes a global destination address, a global transmission source address, a frame identifier (hereafter referred to as a "FID" for short), an HTL (short for hops to live), a data type, transmission information, and a hop count.

The frame identifier is an identification number assigned to each ad hoc frame.

The HTL is a value indicating the period of validity of a data frame. The forwarding unit 16 decrements the value of the HTL by 1 when it forwards a frame to another node device 10.

The data type includes a route flag, an encryption flag, data type information, and reserved areas.

The route flag is to assign route information. When the node device 10 receives a frame having the value of 1 of the route flag, the inspection frame generation unit 31 generates the route inspection frame 5 including route information. On the other hand, when the node device 10 receives a frame having the value of 0 of the route flag, the inspection frame generation unit 31 does not generate the route inspection frame 5.

The encryption flag is set in the node device 10 which receives a frame to notify whether or not a payload has been encrypted. When the value of the encryption flag is 0, the payload has not been encrypted. When the value of the encryption flag is 1, the payload has been encrypted.

The data type is used to identify the data frame and the route inspection frame 5. In the description below, the value of 0 of the data type indicates the frame including the data of an application, the value of 1 of the data type indicates the route inspection frame 5, and the value of 2 of the data type indicates IP (Internet protocol) data.

FIG. 9 also illustrates an example of an information element included in the route information. Each piece of route information records the communication state of one link.

The node device 10 in which a media access control (MAC) address in the route information is recorded is the node device 10 which is a local destination when the route inspection frame 5 is communicated in the link. The route information further includes time information, received signal strength indication (hereafter referred to as "RSSI" for short, and also referred to as reception intensity information), a communication quality evaluation, and a result of transmission.

The time information refers to the time at which the route inspection frame 5 is transmitted toward the node device 10 whose MAC address is recorded in the link whose route information is recorded. The selection unit 32 acquires from the link table 21 the values of the reception intensity information and the communication quality evaluation associated with the local destination of the route inspection frame 5.

Figure 10:
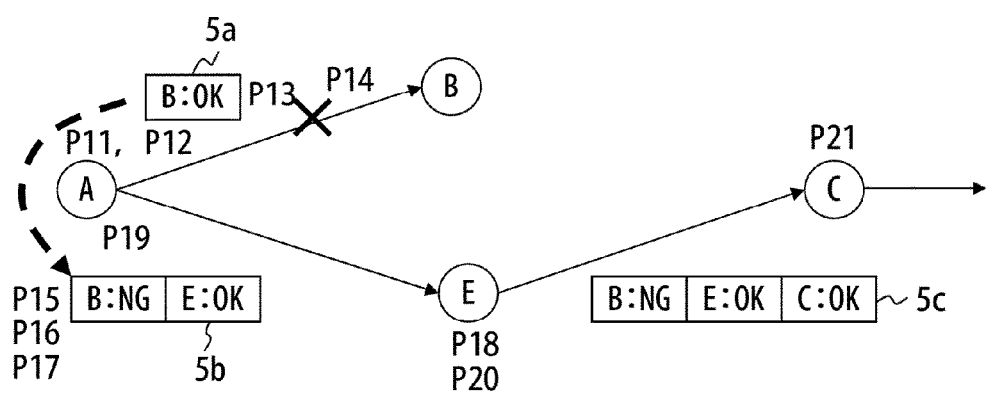
FIG. 10 is an explanatory view of an example of a method of inspecting a route.

FIG. 10 is an explanatory view of an example of a method of inspecting a route. FIG. 10 illustrates a scaled up view of a part of the ad hoc network illustrated in FIG. 1. The explanation below is an example of the following case.

The node A evaluates the condition of the node B as the best in the local destinations of the frames addressed to the GW (that is, LD1=node B).

However, by the fluctuation of the state of radio waves, the state of the link between the node A and the node B has become worse.

The numbers of the procedures described below correspond to the numbers in FIG. 10. Furthermore, assume that, in the description below, each node device 10 in the ad hoc network notifies the GW of the state of the route to the GW at specified time intervals.

The procedure P11 is performed as follows. The inspection frame generation unit 31a of the node A determines to generate the route inspection frame 5 to inspect the state of the route from the node A to the GW. Then, the inspection frame generation unit 31a requests the selection unit 32a to transmit the information about the node device 10 as the destination of the route inspection frame 5.

The procedure P12 is performed as follows. The selection unit 32a refers to the routing table 22a (refer to FIG. 6). If the GW is a global destination in the routing table 22a, LD1=node B and LD2=node E. Then, the selection unit 32a selects the node B as the destination of the route inspection frame 5. The selection unit 32a acquires the following information about the link between the node B and the node A from the link table 21a (refer to FIG. 5), and outputs the information to the inspection frame generation unit 31a.

| MAC ADDRESS | MAC ADDRESS OF NODE B |
| RECEPTION INTENSITY | Eb |
| COMMUNICATION QUALITY EVALUATION | LOW |

The procedure P13 is performed as follows. The inspection frame generation unit 31a generates the route inspection frame 5a including the information notified from the selection unit 32a. At this time point, the inspection frame generation unit 31a assumes that the route inspection frame 5a may be transmitted to the node B. Furthermore, the inspection frame generation unit 31a obtains the time when the route inspection frame 5a is transmitted, and includes the time in the frame.

Assume that the inspection frame generation unit 31a may hold in advance a prediction value of the time period taken from the time when the generation of the route inspection frame 5 is completed to the time when the generated route inspection frame 5 is transmitted from the node device 10. The inspection frame generation unit 31a sets the time obtained by adding the prediction value to the time when the route inspection frame 5a is generated as the time when the route inspection frame 5a is transmitted. Therefore, for example, the following information is included in the route inspection frame 5a.

| GLOBAL DESTINATION | GW |
| --- | --- |
| GLOBAL TRANSMISSION SOURCE | NODE A |
| LOCAL DESTINATION | NODE B |
| LOCAL TRANSMISSION SOURCE | NODE A |
| FRAME TYPE | 1 (DATA FRAME) |
| ROUTE FLAG | 1 (ROUTE INFORMATION) |
| DATA TYPE | 1 (ROUTE INSPECTION FRAME) |
| ROUTE INFORMATION #0 | |
| MAC ADDRESS | MAC ADDRESS OF NODE B |
| TIME INFORMATION | T1 |
| RECEPTION INTENSITY | Eb |
| COMMUNICATION QUALITY EVALUATION | BAD |
| RESULT OF TRANSMISSION | SUCCESSFUL |

The inspection frame generation unit 31a outputs the route inspection frame 5a to the frame transmission unit 12. The frame transmission unit 12 performs the process of transmitting the route inspection frame 5a. The inspection frame generation unit 31a notifies the judgment unit 33a of the time T1. The judgment unit 33a measures the elapsed time from the time T1.

As illustrated as the procedure P14, it is assumed that the route inspection frame 5a has not been transmitted to the node B due to the degraded state of communications in the link between the node A and the node B.

The procedure P15 is performed as follows. The judgment unit 33a stores in advance the time Tw in which the Ack is awaited from the transmission of the route inspection frame 5. When the Ack for the route inspection frame 5 is not acquired from the node B after the elapse of time of Tw from the time T1, the judgment unit 33a judges that the transmission of the route inspection frame 5a to the node B has failed.

Then, the judgment unit 33a notifies the selection unit 32a of the following information.

The transmission of the route inspection frame 5a in which the node B is set as the LD has failed.

The global destination of the route inspection frame 5a is the GW.

The procedure P16 is performed as follows. The selection unit 32a searches the node other than the node B for the node device 10 as the destination to which a frame addressed to the GW is forwarded using the routing table 22a. The selection unit 32a selects the node E in the routing table 22a (refer to FIG. 6) as the local destination of the route inspection frame 5 which is next transmitted.

The selection unit 32a acquires the following information about the link between the node E and the node A from the link table 21a (refer to FIG. 5). Furthermore, the selection unit 32a outputs the following information to the inspection frame generation unit 31a.

| STATE | TRANSMISSION OF ROUTE INSPECTION FRAME 5a WHOSE LD IS NODE B FAILED |
| --- | --- |
| MAC ADDRESS OF NEW LD | MAC ADDRESS OF NODE E |

-continued

| RECEPTION INTENSITY | Ee |
| --- | --- |
| COMMUNICATION QUALITY EVALUATION | GOOD |

The procedure 17 is performed as follows. When the inspection frame generation unit 31a is notified from the selection unit 32a that the transmission of the route inspection frame 5a whose LD is the node B has failed, the inspection frame generation unit 31a changes the result of the transmission of the route information whose LD is the node B into "failure". Furthermore, the inspection frame generation unit 31a generates the route inspection frame 5b including the following information using the information notified from the selection unit 32a. The method of calculating the time information about the route information #1 is similar to that of the procedure P13.

| GLOBAL DESTINATION | GW |
| --- | --- |
| GLOBAL TRANSMISSION SOURCE | NODE A |
| LOCAL DESTINATION | NODE E |
| LOCAL TRANSMISSION SOURCE | NODE A |
| FRAME TYPE | 1 |
| ROUTE FLAG | 1 |
| DATA TYPE | 1 |
| ROUTE INFORMATION #0 | |
| MAC ADDRESS | MAC ADDRESS OF NODE B |
| TIME INFORMATION | T1 |
| RECEPTION INTENSITY | Eb |
| COMMUNICATION QUALITY EVALUATION | BAD |
| RESULT OF TRANSMISSION | FAILED |
| ROUTE INFORMATION #1 | |
| MAC ADDRESS | MAC ADDRESS OF NODE E |
| TIME INFORMATION | T2 |
| RECEPTION INTENSITY | Ee |
| COMMUNICATION QUALITY EVALUATION | GOOD |
| RESULT OF TRANSMISSION | SUCCESSFUL |

When the route inspection frame 5b is generated, the inspection frame generation unit 31a assumes that the route inspection frame route inspection frame 5b may be transmitted to the node E.

The inspection frame generation unit 31a transmits the route inspection frame 5b to the node E through the frame transmission unit 12. The inspection frame generation unit 31a notifies the judgment unit 33a of the time T2, and the judgment unit 33a measures the elapsed time from the time T2.

The procedure P18 is performed as follows. Assume that the route inspection frame 5b has reached the node E. Upon receipt of the route inspection frame 5b, the frame reception unit 11e of the node E outputs the frame to the frame information analysis unit 13e. The frame information analysis unit 13e judges the type of the received frame using the type field of the route inspection frame 5b and the value of the data type. In this example, since the value of the type is 1, and the value of the data type is 1, the frame information analysis unit 13e judges that the route inspection frame 5 has been received. The frame information analysis unit 13e outputs the input route inspection frame 5b to the judgment unit 33e.

Upon receipt of the route inspection frame 5 in which the value of the route flag is set to 1, the judgment unit 33e judges that a route originated from the node device 10 has been inspected. Then, the judgment unit 33e notifies the inspection frame generation unit 31e of the global destination of the route inspection frame 5b. In this example, the judgment unit 33e notifies the inspection frame generation unit 31e that the global destination of the route inspection frame 5b is the GW.

Furthermore, the judgment unit 33e generates an Ack to notify the local transmission source of the route inspection frame 5b that the route inspection frame 5b has been received. That is, the judgment unit 33e generates the Ack for the route inspection frame 5b addressed to the node A, and transmits the generated frame to the node A through the frame transmission unit 12e. In the frame to be transmitted as an Ack, the value of the route flag is set to 0.

The procedure P19 is performed as follows. The frame reception unit 11a of the node A outputs the Ack received from the node E to the frame information analysis unit 13a. The frame information analysis unit 13a outputs the Ack to the judgment unit 33a in the process similar to the process described above with reference to the procedure P18.

Upon receipt of the route inspection frame 5 whose value of the route flag is set to 0, the judgment unit 33a judges that the Ack for the route inspection frame 5 transmitted from the node A has been received. If the Ack is input before the elapse of the specified time Tw, the judgment unit 33a judges that the transmission of the route inspection frame 5 to the global transmission source of the Ack has been successfully performed. Then, the judgment unit 33a judges that it is not necessary to newly transmit the route inspection frame 5 from the node A, thereby terminating the process.

The procedure P20 is performed as follows. When the inspection frame generation unit 31e of the node E is notified from the judgment unit 33e that the route inspection frame 5 whose global destination is the GW has been received, the inspection frame generation unit 31e requests the selection unit 32e to select a destination to generate the route inspection frame 5. The selection unit 32e selects the local destination from the routing table 22e in the process similar to the process described above with reference to the procedure P12. In the example illustrated in FIG. 10, the node C is selected as a local destination.

The selection unit 32e acquires the state of the link to the node device 10 selected as the local destination from the link table 21e, and outputs the state to the inspection frame generation unit 31e. The inspection frame generation unit 31e generates the route inspection frame 5c in the process similar to the method described above with reference to the procedure P13 by assuming that the transmission to the node C has been successfully performed. The route inspection frame 5c is transmitted from the frame transmission unit 12e to the node C.

The procedure P21 is performed as follows. Assume that the route inspection frame 5c has been received by the node C. In this case, the process of the node C is similar to the process described above with reference to the procedure P18. On the other hand, the node E performs the process similar to the process described above with reference to the procedure P19 when the node E receives the Ack for the route inspection frame 5c from the node C.

The above-mentioned process performed by each node device 10 is referred to as the procedure P22 for convenience. In the procedure P22, the route inspection frame 5 including the information about the state of the links included in the route from the node A to the GW and the links selected as the destination to which a frame is to be forwarded between the node A and the GW is transmitted to the GW. Upon receipt of the route inspection frame 5 including a result of the inspection of the route from the node A to the GW, the GW transmits the acquired information to the server 42. The server 42 receives the result of the inspection of the route from the GW through the network 41.

By the process performed as described above, the operator who uses the server 42 may identify the state of each link included in the route for the routes in the ad hoc network. For example, in the example illustrated in FIG. 10, since the communication has failed between the node A and the node B, the operator may recognize that the communication environment of the link between the node A and the node B is degraded. Also for the link in which a communication is successfully performed, the fluctuation of the communication environment may be monitored using the value of the communication quality evaluation for each link.

Figure 11B:
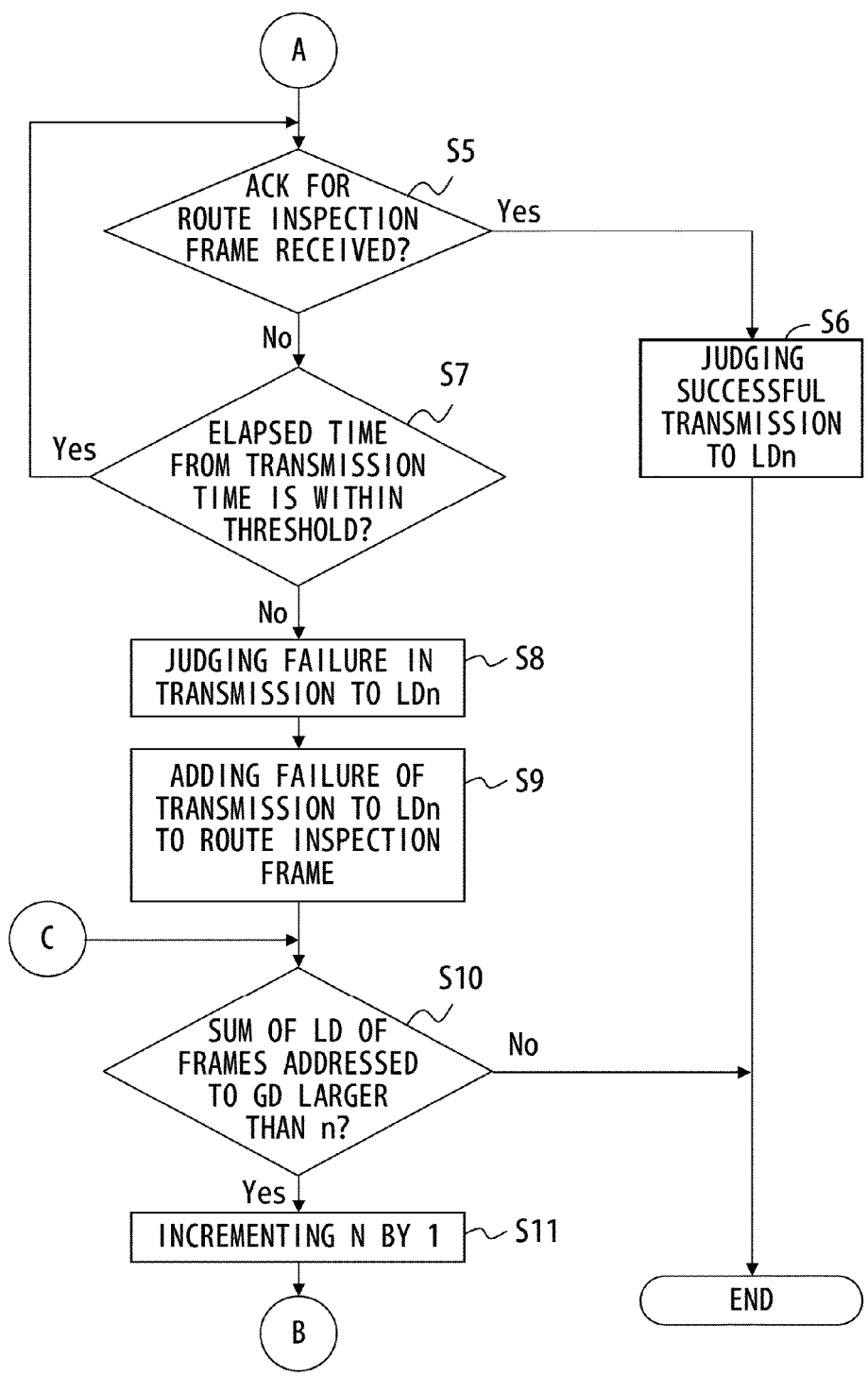

FIGS. 11A and 11B are flowcharts for explanation of the operation of the node device 10. In the flowcharts in FIGS. 11A and 11B, the character "n" is a variable to be used in counting the number of LDs which have performed processes, and the character "N" indicates the total number of local destinations associated with the global destination of the route inspection frame 5. Furthermore, the characters "LDn" indicate the n-th local destination associated with the global destination of the route inspection frame 5.

Upon notification of the global destination of the route inspection frame 5 from the inspection frame generation unit 31, the selection unit 32 sets the variable n to 1 (step S1).

The selection unit 32 judges whether or not the n-th local destination (LDn) is recorded in the route inspection frame 5 as a node to which the transmission of the route inspection frame 5 has failed (step S2).

If the LDn is not recorded in the route inspection frame 5 as a node to which the transmission of the route inspection frame 5 has failed (NO in step S2), then the selection unit 32 extracts the information about the LDn from the link table 21, and outputs the information to the inspection frame generation unit 31. Then, the inspection frame generation unit 31 generates the route inspection frame 5 using the information input from the selection unit 32 (step S3).

Next, the inspection frame generation unit 31 transmits the generated route inspection frame 5 to the LDn through the frame transmission unit 12 (step S4). Then, the judgment unit 33 judges whether or not the Ack for the route inspection frame 5 has been received after the transmission of the route inspection frame 5 (step S5). Upon receipt of the Ack for the route inspection frame 5 (YES in step S5), the judgment unit 33 judges that the transmission of the route inspection frame 5 to the LDn has been successfully performed, thereby terminating the process (step S6).

On the other hand, if the Ack for the route inspection frame 5 has not been received (NO in step S5), then the judgment unit 33 judges whether or not the elapsed time from the transmission time is lower than a threshold Tw (step S7). If the elapsed time from the transmission time is lower than a threshold Tw (YES in step S7), the judgment unit 33 repeats the processes in and after step S5. Therefore, the judgment unit 33 waits for the Ack for the route inspection frame 5 until the elapsed time exceeds the threshold Tw after the transmission time of the route inspection frame 5.

If the Ack for the route inspection frame 5 has not been received, and the elapsed time from the transmission time exceeds the threshold Tw (NO in step S5, and NO in step S7), the judgment unit 33 judges that the transmission of the route inspection frame 5 to the LDn has failed (step S8). Then, the inspection frame generation unit 31 sets the result of the transmission as "failure" relating to the route information to the LDn in the route information of the route inspection frame 5 transmitted in step S4 (step S9).

Then, the selection unit 32 compares the variable n with the total number N of the local destinations associated with the global destination of the route inspection frame 5 (step S10). If the total number N of the local destinations is larger than the variable n (YES in step S10), then all processes on all local destinations have not been completed. Therefore, in this case, the selection unit 32 increments n by 1 (step S11), and returns control to step S2.

If the total number N of the local destinations is equal to the variable n (NO in step S10), then the processes on all local destinations have been completed. Therefore, in this case, the selection unit 32 terminates the process.

If the n-th local destination (LDn) is recorded in step S2 in the route inspection frame 5 as a node on which the transmission of the route inspection frame 5 has failed, then the processes in steps S3 through S9 are not performed, and the processes in and after step S10 are performed.

Example of Analyzing Route Information

Described next is the method of finding out a network topology from the route information acquired using the route inspection frame 5 in the server 42. The following analysis is performed by the processor which is loaded into the server 42, a computer connected to the server 42, etc., and executes software, but may also be performed by an operator who uses the system.

Assume that the node illustrated in FIG. 12 is included in the network at the stage before the analysis. Therefore, the server 42 may communicate with the GW included in the ad hoc network through the network 41.

In the ad hoc network in which the GW participates, two relay nodes R1 and R2, and four meters M1 through M4 are included. In the description below, it is assumed that the meters M1 through M4 are power, gas, and water inspection meters. The meters M1 through M4 acquire inspection data at specified intervals, and transmit the acquired data to the GW.

The GW transmits the inspection data received from each meter to the server 42 through the network 41. Furthermore, the meters M1 through M4 periodically collect the information about the route to the GW using the route inspection frame 5, and transmit the information to the GW. The GW transmits the acquired route information to the server 42.

In the example illustrated in FIG. 12, it is assumed that the inspection data acquired by the meters M1, M2, and M3 is periodically transmitted to the server 42, but the inspection data acquired by the meter M4 has not been periodically transmitted to the server 42. In this case, there is the possibility that since the state of the route from the meter M4 to the GW is not good, the inspection data acquired by the meter M4 has been lost in the ad hoc network. Then, the information about the route from the meter M4 to the GW which has been acquired is analyzed.

FIG. 13 is an example of route information input to a server. In FIG. 13, each hop is identified by a label such as a "hop #1" etc. for convenience. Furthermore, in FIG. 13, in the route information acquired using the route inspection frame 5 whose global transmission source is the meter M4 and whose global destination is the GW for comprehensibility, only the following information is extracted and described.
a node specified as an LD
a communication quality evaluation of a link
a result of a transmission When the result of an analysis such as route information A1 in FIG. 13 is acquired, the route information is transmitted to the GW from the meter M4 to the meter M1 through the relay node R1. The following information is obtained from the route information A1 in FIG. 13.

A link is formed between the meter M4 and the meter M1, between the meter M1 and the relay node R1, and between the relay node R1 and the GW.

A communication is successfully performed in each of the above-mentioned links.

The following information are also acquired from the route information A1.

The communication quality of the link between the relay node R1 and the GW is good.

However, the communication quality of the link between the meter M4 and the meter M1 and the link between the meter M1 and the relay node R1 is medium.

On the other hand, in the route information A2 in FIG. 13, the transmission from the meter M4 to the meter M1 has failed at hop #1. Therefore, the meter M4 transmits the route inspection frame 5 to the meter M2 at hop #2. Furthermore, the meter M2 transmits the route inspection frame 5 to the meter M1 at hop #3.

Then, using the route information A2 in FIG. 13, in addition to the information acquired from the route information A1, the information about the link between the meter M4 and the meter M2 and the information about the link between the meter M2 and the meter M1 are acquired. The communications are successfully performed with the link between the meter M4 and the meter M2 and the link between the meter M2 and the meter M1.

Although the communication quality of the link between the meter M2 and the meter M1 is good, the communication quality of the link between the meter M4 and the meter M2 is medium according to the route information A2 in FIG. 13. Furthermore, it is also recognized from the route information A2 in FIG. 13 that a communication may fail between the meter M4 and the meter M1.

In the route information A3 in FIG. 13, the transmission from the meter M4 to the meter M1 fails at hop #1, and the transmission from the meter M4 to the meter M2 also fails at hop #2. Then, at hop #3, the meter M4 transmits the route inspection frame 5 to the meter M3.

Furthermore, the meter M3 transmits the route inspection frame 5 to the m2 at hop #4. At and after hop #4 indicated by the route information A3 in FIG. 13, the process is the same as at and after hop #2 indicated by the route information A2.

Then, using the route information A3 in FIG. 13, the information about the link between the meter M4 and the meter M3 and the information about the link between the meter M3 and the meter M2 are acquired. Communications are successfully performed in the link between the meter M4 and the meter M3 and in the link between the meter M3 and the meter M2.

It is also known from the route information A3 in FIG. 13 that although the communication quality of the link between the meter M4 and the meter M3 is bad, the communication quality of the link between the meter M3 and the meter M2 is medium. Furthermore, it is also recognized from the route information A3 in FIG. 13 that a communication may fail between the meter M4 and the meter M2.

Figure 14:
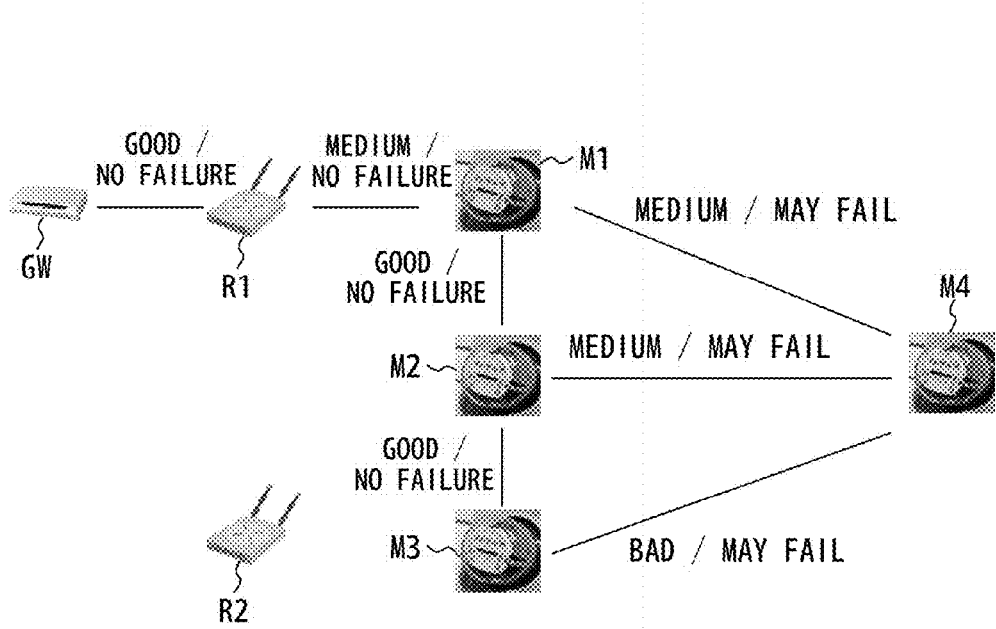
FIG. 14 is an example of a network topology.

FIG. 14 is an example of a network topology. By analyzing the route information A1 through A3 illustrated in FIG. 13, a result of an analysis is that the ad hoc network formed by the node device illustrated in FIG. 12 is illustrated in FIG. 14.

Furthermore obtained is a result that there is a strong possibility that the failure of the transmission of data from the meter M4 to the GW is caused by the failure of the communication which has been performed in the link between the meter M4 and the meter M1, the link between the meter M4 and the meter M2, or the link between the meter M4 and the meter M3. Assume that the processor which analyzes the network topology may output an acquired result to the display device so that the operator may view the result appropriately. In addition, the processor which analyzes the network topology may output a proposition to change a network to the display device together with a result of the analysis.

FIG. 15 is an example of changing a network. In the example illustrated in FIG. 15, the link whose communication quality is medium and which may incur a communication failure is to be improved in communication quality. In the example in FIG. 15, a relay node R3 is provided between the meter M4 and the meter M1, and a relay node R4 is provided between the meter M4 and the meter M2. FIG. 15 is an example of changing a network, and the probability of the success in transmission of a frame from the meter M4 to the GW may be improved by changing the communication quality with another node.

Thus, in the method according to the embodiment of the present invention, the information for identification of a link in which a communication has failed is transmitted to the GW through a destination node device of an inspection frame. Since the GW transmits using an inspection frame the route information including the information for identification of the link in which a communication has failed, the server may obtain the network topology including the link in which a communication has failed. Furthermore, by presenting to the operator the topology information acquired as a result of an analysis, the operator etc. may be notified of a candidate for an installation location such as a new node device etc.

Second Embodiment

According to the first embodiment, described is the method of finding out the degradation of the state of a link. It is also monitored according to the first embodiment whether or not a loop or backtracking has occurred in a route. According to the second embodiment, explained is the case in which it is monitored whether or not a communication route is an efficient route. In the second embodiment, it is assumed that a FID is used to detect a loop and backtracking.

Figure 16:
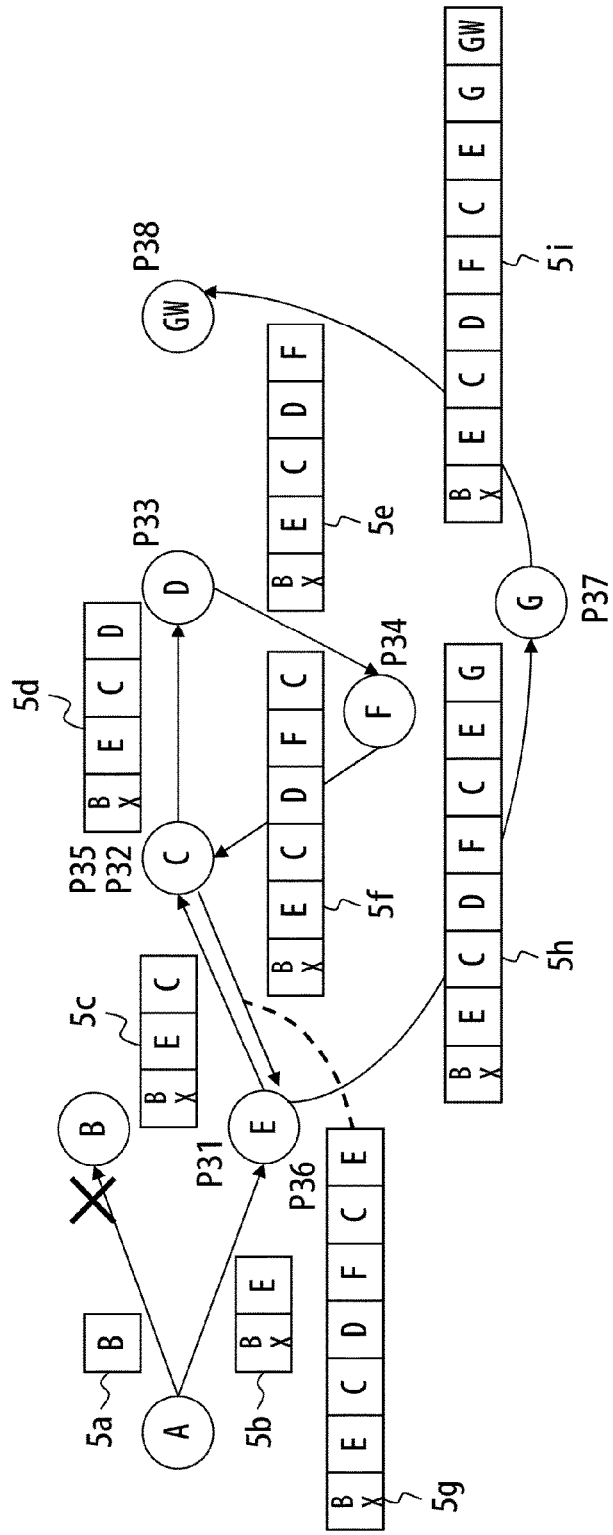
FIG. 16 is an explanatory view of an example of inspecting a route.

FIG. 16 is an explanatory view of an example of inspecting a route. Hereafter, explained is an example of inspecting route information about a route from the node A to the GW in the ad hoc network illustrates in FIG. 16.

In FIG. 16, in the routing table 22a held by the node A, the local destination with the GW as a global destination is the node B as an LD1 and the node E as an LD2. In the routing table 22c held by the node C, the local destination with the GW as a global destination is the node D as an LD1 and the node E as an LD2. Furthermore, in the routing table 22e held by the node E, the local destination with the GW as a global destination is the node C as an LD1 and the node G as an LD2.

The processes performed until the route inspection frame 5b is received from the node A to the node E are similar to the processes in the procedures P11 through P19 explained with reference to FIG. 10. Described below are the examples of the processes performed during and after the transmission of the route inspection frame 5c.

The procedure P31 is performed as follows. The judgment unit 33e of the node E identifies the value of the FID included in the received route inspection frame 5b and the global destination and the global transmission source of the route inspection frame 5b. As a result of analyzing the route inspection frame 5b, assume that the judgment unit 33e has acquired the information that the global destination is the GW, the global transmission source is the node A, and the FID is 1.

The judgment unit 33e notifies the inspection frame generation unit 31e of the global destination, the global transmission source, and the value of the FID of the route inspection frame 5b. The inspection frame generation unit 31e requests the selection unit 32e to select the local destination to generate the route inspection frame 5 depending on the notification from the judgment unit 33e.

The selection unit 32e selects the local destination from the routing table 22e by the process similar to the process described above with reference to the procedure P12. In the example in FIG. 16, the node C is selected as a local destination. The selection unit 32e acquires from the link table 21e the state of the link to the node device 10 selected as the local destination, and outputs the state to the inspection frame generation unit 31e.

The inspection frame generation unit 31e assumes that the transmission to the node C has been successfully performed by the process similar to the method described above with reference to the procedure P13, thereby generating the route inspection frame 5c. In this case, the inspection frame generation unit 31e sets the global destination, the global transmission source, and the value of the FID of the route inspection frame 5c as those of the route inspection frame 5b.

The inspection frame generation unit 31e outputs the route inspection frame 5c to the judgment unit 33e and the frame transmission unit 12e. The judgment unit 33e stores the combination of a global destination, a global transmission source, and a local destination as associated with the FID included in the route inspection frame 5c. That is, in this example, the judgment unit 33e stores the following combination.

global destination=GW
global transmission source=node A
local destination=node C
FID=1

Then the frame transmission unit 12e transmits the route inspection frame 5c to the node C.

The procedure P32 is performed as follows. Assume that the route inspection frame 5c has been received by the node C. The process performed by the node C is similar to the process described above with reference to the procedures P18 and P31. Therefore, upon receipt of the Ack for the route inspection frame 5c from the node C, the node E performs the processes similar to the processes described with reference to the procedure P19.

When the global destination is the GW, the node D is the LD1 in the routing table 22c. Therefore, the selection unit 32c outputs the information about the link between the node D and the node C to the inspection frame generation unit 31c. Then, the inspection frame generation unit 31c generates the route inspection frame 5d including the following information about the link, and outputs the frame to the judgment unit 33c and the frame transmission unit 12c.

| | | |
|---|---|---|
| GLOBAL DESTINATION | | GW |
| GLOBAL TRANSMISSION SOURCE | | NODE A |
| LOCAL DESTINATION | | NODE D |
| LOCAL TRANSMISSION SOURCE | | NODE C |
| FID | | 1 |
| HOP #1 | LINK INFORMATION BETWEEN NODE A AND NODE B | TRANSMISSION FAILED |
| HOP #2 | LINK INFORMATION BETWEEN NODE A AND NODE E | TRANSMISSION SUCCEEDED |
| HOP #3 | LINK INFORMATION BETWEEN NODE E AND NODE C | TRANSMISSION SUCCEEDED |
| HOP #4 | LINK INFORMATION BETWEEN NODE C AND NODE D | TRANSMISSION SUCCEEDED |

Then, the judgment unit 33c stores the following combination.
  global destination=GW
  global transmission source=node A
  local destination=node D
  FID=1

Then the frame transmission unit 12c transmits the route inspection frame 5d to the node D.

The procedure P33 is performed as follows. Assume that the route inspection frame 5d has been received by the node D. The process performed by the node D is similar to the process described above with reference to the procedures P18 and P31. Therefore, upon receipt of the Ack for the route inspection frame 5d from the node D, the node C terminates the process of transmitting the route inspection frame 5.

When the global destination is the GW in the routing table 22d, the node F is the LD1. Then, the inspection frame generation unit 31d generates the route inspection frame 5e including the following information about the link, and outputs the frame to the judgment unit 33d and the frame transmission unit 12d.

| GLOBAL DESTINATION | | GW |
|---|---|---|
| GLOBAL TRANSMISSION SOURCE | | NODE A |
| LOCAL DESTINATION | | NODE F |
| LOCAL TRANSMISSION SOURCE | | NODE D |
| FID | | 1 |
| HOP #1 | LINK INFORMATION BETWEEN NODE A AND NODE B | TRANSMISSION FAILED |
| HOP #2 | LINK INFORMATION BETWEEN NODE A AND NODE E | TRANSMISSION SUCCEEDED |
| HOP #3 | LINK INFORMATION BETWEEN NODE E AND NODE C | TRANSMISSION SUCCEEDED |
| HOP #4 | LINK INFORMATION BETWEEN NODE C AND NODE D | TRANSMISSION SUCCEEDED |
| HOP #5 | LINK INFORMATION BETWEEN NODE D AND NODE F | TRANSMISSION SUCCEEDED |

Then the frame transmission unit 12d transmits the route inspection frame 5e to the node F.

The procedure P34 is performed as follows. Upon receipt of the route inspection frame 5e, the node F performs the process similar to the process of the node D in the procedure P33. In this case, assuming that the node C is the LD1 in the routing table 22f with the GW set as a global destination, the inspection frame generation unit 31f generates the route inspection frame 5f including the following link information.

| GLOBAL DESTINATION | | GW |
|---|---|---|
| GLOBAL TRANSMISSION SOURCE | | NODE A |
| LOCAL DESTINATION | | NODE C |
| LOCAL TRANSMISSION SOURCE | | NODE F |
| FID | | 1 |
| HOP #1 | LINK INFORMATION BETWEEN NODE A AND NODE B | TRANSMISSION FAILED |
| HOP #2 | LINK INFORMATION BETWEEN NODE A AND NODE E | TRANSMISSION SUCCEEDED |
| HOP #3 | LINK INFORMATION BETWEEN NODE E AND NODE C | TRANSMISSION SUCCEEDED |
| HOP #4 | LINK INFORMATION BETWEEN NODE C AND NODE D | TRANSMISSION SUCCEEDED |
| HOP #5 | LINK INFORMATION BETWEEN NODE D AND NODE F | TRANSMISSION SUCCEEDED |
| HOP #6 | LINK INFORMATION BETWEEN NODE F AND NODE C | TRANSMISSION SUCCEEDED |

The procedure P35 is performed as follows. Assume that when the node C receives the route inspection frame 5f, the judgment unit 33c acquires the information that the GW is the global destination, the node A is the global transmission source, and the FID is 1. The judgment unit 33c holds the information about the frame including the same information about the combination of the global destination, the global transmission source, and the value of the FID. Therefore, the judgment unit 33c judges that the route inspection frame 5 including the information about the route inspection frame 5d transmitted by the node C has reached the node C again before reaching the global destination.

Therefore, the judgment unit 33c requests the inspection frame generation unit 31c to generate the route inspection frame 5 transmitted to the local destination not associated with the combination of the global destination, the global transmission source, and the value of the FID. In the example in FIG. 16, the inspection frame generation unit 31c requests the selection unit 32c to select the node other than the node D as the local destination of the new route inspection frame 5g.

Since the node D is the LD1 and the node E is the LD2 when the GW is the global destination in the routing table 22c, the selection unit 32c notifies the inspection frame generation unit 31c of the node E as the destination of the route inspection frame 5g. Then, the inspection frame generation unit 31c generates the route inspection frame 5g including the following information.

| GLOBAL DESTINATION | | GW |
|---|---|---|
| GLOBAL TRANSMISSION SOURCE | | NODE A |
| LOCAL DESTINATION | | NODE E |
| LOCAL TRANSMISSION SOURCE | | NODE C |
| FID | | 1 |
| HOP #1 | LINK INFORMATION BETWEEN NODE A AND NODE B | TRANSMISSION FAILED |
| HOP #2 | LINK INFORMATION BETWEEN NODE A AND NODE E | TRANSMISSION SUCCEEDED |
| HOP #3 | LINK INFORMATION BETWEEN NODE E AND NODE C | TRANSMISSION SUCCEEDED |
| HOP #4 | LINK INFORMATION BETWEEN NODE C AND NODE D | TRANSMISSION SUCCEEDED |
| HOP #5 | LINK INFORMATION BETWEEN NODE D AND NODE F | TRANSMISSION SUCCEEDED |
| HOP #6 | LINK INFORMATION BETWEEN NODE F AND NODE C | TRANSMISSION SUCCEEDED |
| HOP #7 | LINK INFORMATION BETWEEN NODE C AND NODE E | TRANSMISSION SUCCEEDED |

Then, the frame transmission unit 12c transmits the route inspection frame 5g to the node E.

The procedure P36 is performed as follows. When the node E receives the route inspection frame 5g, the judgment unit 33e performs the process similar to the process described above with reference to the procedure P35, hereby judging that the route inspection frame 5 has reached the node E again before the route inspection frame 5 including the information about the route inspection frame 5c transmitted by the node E reached the global destination. Therefore, the inspection frame generation unit 31e generates the route inspection frame 5h including the following information by setting as the local destination the node not set as the local destination of the route inspection frame 5c.

| GLOBAL DESTINATION | | GW |
|---|---|---|
| GLOBAL TRANSMISSION SOURCE | | NODE A |
| LOCAL DESTINATION | | NODE G |
| LOCAL TRANSMISSION SOURCE | | NODE E |
| FID | | 1 |
| HOP #1 | LINK INFORMATION BETWEEN NODE A AND NODE B | TRANSMISSION FAILED |
| HOP #2 | LINK INFORMATION BETWEEN NODE A AND NODE E | TRANSMISSION SUCCEEDED |
| HOP #3 | LINK INFORMATION BETWEEN | TRANSMISSION |

|  | NODE E AND NODE C | SUCCEEDED |
| --- | --- | --- |
| HOP #4 | LINK INFORMATION BETWEEN NODE C AND NODE D | TRANSMISSION SUCCEEDED |
| HOP #5 | LINK INFORMATION BETWEEN NODE D AND NODE F | TRANSMISSION SUCCEEDED |
| HOP #6 | LINK INFORMATION BETWEEN NODE F AND NODE C | TRANSMISSION SUCCEEDED |
| HOP #7 | LINK INFORMATION BETWEEN NODE C AND NODE E | TRANSMISSION SUCCEEDED |
| HOP #8 | LINK INFORMATION BETWEEN NODE E AND NODE G | TRANSMISSION SUCCEEDED |

Then, the frame transmission unit 12e transmits the route inspection frame 5h to the node G.

The procedure P37 is performed as follows. Assume that the node G has received the route inspection frame 5h. The process performed by the node G is similar to the process of the node D. Therefore, the route inspection frame 5i including the following information is generated.

| GLOBAL DESTINATION | GW |
| --- | --- |
| GLOBAL TRANSMISSION SOURCE | NODE A |
| LOCAL DESTINATION | GW |
| LOCAL TRANSMISSION SOURCE | NODE G |
| FID | 1 |
| HOP #1  LINK INFORMATION BETWEEN NODE A AND NODE B | TRANSMISSION FAILED |
| HOP #2  LINK INFORMATION BETWEEN NODE A AND NODE E | TRANSMISSION SUCCEEDED |
| HOP #3  LINK INFORMATION BETWEEN NODE E AND NODE C | TRANSMISSION SUCCEEDED |
| HOP #4  LINK INFORMATION BETWEEN NODE C AND NODE D | TRANSMISSION SUCCEEDED |
| HOP #5  LINK INFORMATION BETWEEN NODE D AND NODE F | TRANSMISSION SUCCEEDED |
| HOP #6  LINK INFORMATION BETWEEN NODE F AND NODE C | TRANSMISSION SUCCEEDED |
| HOP #7  LINK INFORMATION BETWEEN NODE C AND NODE E | TRANSMISSION SUCCEEDED |
| HOP #8  LINK INFORMATION BETWEEN NODE E AND NODE G | TRANSMISSION SUCCEEDED |
| HOP #9  LINK INFORMATION OF NODE G AND GW | TRANSMISSION SUCCEEDED |

Then, the route inspection frame 5i is transmitted from the frame transmission unit 12g to the GW.

The procedure P38 is performed as follows. Upon receipt of the route inspection frame 5i including the result of the inspection of the route from the node A to the GW, the GW transmits to the server 42 the information acquired from the frame. The server 42 receives the result of the inspection of the route from the GW through the network 41.

The method of analyzing the route information by the server 42 etc. is similar to the method in the first embodiment. When the information acquired according to the second embodiment is analyzed, it is identified that the route inspection frame 5 has been transmitted from the node A to the GW through the route illustrated in FIG. 16. Therefore, the following three problems may be identified in the ad hoc network.

A failure of a communication between the node A and the node B

An occurrence of a loop among the node C, the node D and the node E

An occurrence of a backtracking between the node E and the node C

Thus, according to the second embodiment, the node device 10 may autonomously detect a loop and backtracking using a combination of the value of the FID and a local destination of the route inspection frame 5. Furthermore, the route inspection frame 5 includes the information about all links on which a transmission has been attempted when the communication quality evaluation of a link and the route inspection are performed. Therefore, a loop and backtracking may be detected in the server 42 which acquired the information included in the route inspection frame 5. Furthermore, as with the first embodiment, a link in which a transmission has failed may be identified.

Third Embodiment

FIG. 17 is an example of a transmitting process performed according to the third embodiment of the present invention. In the third embodiment, described is the method of the process performed when the node device 10 which has successfully received the route inspection frame 5 describes the communication quality of each link and a result of a transmission. When the transmission of the route inspection frame 5 fails, it is assumed that the information about a link with which the source node device 10 has failed in a transmission.

Described below is an example of a process performed according to the third embodiment. The process performed when the node device 10 of the global transmission source of the route inspection frame 5 starts generating the route inspection frame 5 is similar to the procedure P11 which is described above with reference to FIG. 10.

In the procedure P41, the selection unit 32a refers to the routing table 22a, and determines the node device 10 which transmits the route inspection frame 5m. In this example, it is assumed that the node B has been selected as the destination of the route inspection frame 5m. The selection unit 32a outputs the MAC address of the node B to the inspection frame generation unit 31.

The procedure P42 is performed as follows. The inspection frame generation unit 31a generates the route inspection frame 5m including the following information. The frame transmission unit 12 transmits the route inspection frame 5m to the node B. The method of calculating the time information about the route information #1 is similar to the procedure P13.

| GLOBALDESTINATION | GW |
| --- | --- |
| GLOBALTRANSMISSIONSOURCE | NODE A |
| LOCAL DESTINATION | NODE B |
| LOCAL TRANSMISSIONSOURCE | NODE A |
| FRAME TYPE | 1 |
| ROUTE FLAG | 1 |
| DATA TYPE | 1 |
| ROUTE INFORMATION #0 | |
| MAC ADDRESS | MAC ADDRESS OF NODE B |
| TIME INFORMATION | T1 |

The inspection frame generation unit 31a notifies the judgment unit 33a of the time T1, and the judgment unit 33a measures the elapsed time from the time T1.

The procedure P43 is performed as follows. By the degraded state of communications of the link between the node A and the node B, it is assumed that the route inspection frame 5m has not reached the node B. The judgment unit 33a requests the selection unit 32a to select the local destination other than the node B by the process similar to the procedure P15.

The selection of the local destination performed by the selection unit 32a in the procedure P44 is similar to the procedure P16. The selection unit 32a acquires from the link table 21a the information about the link with the node device 10 in which a transmission has failed, and notifies the inspection frame generation unit 31a of the acquired information. If the node E is selected as the local destination of the route inspection frame 5n to be transmitted next, the n the selection unit 32a outputs the following information to the inspection frame generation unit 31a.

| STATE | TRANSMISSION OF ROUTE INSPECTION FRAME 5 WHOSE LD IS NODE B FAILED |
|---|---|
| COMMUNICATION QUALITY OF THE LINK IN WHICH A TRANSMISSION HAS BEEN UNSUCCESSFULLY PERFORMED | BAD |
| RECEPTION INTENSITY OF THE LINK IN WHICH A TRANSMISSION HAS BEEN UNSUCCESSFULLY PERFORMED | Eb |
| MAC ADDRESS OF NEW LD | MAC ADDRESS OF THE NODE E |

The procedure P45 is performed as follows. The inspection frame generation unit 31a generates the route inspection frame 5n including the following information using the information notified from the selection unit 32a.

| GLOBAL DESTINATION | GW |
|---|---|
| GLOBAL TRANSMISSION SOURCE | NODE A |
| LOCAL DESTINATION | NODE E |
| LOCAL TRANSMISSION SOURCE | NODE A |
| FRAME TYPE | 1 |
| ROUTE FLAG | 1 |
| DATA TYPE | 1 |
| ROUTE INFORMATION #0 | |
| MAC ADDRESS | MAC ADDRESS OF NODE B |
| TIME INFORMATION | T1 |
| RECEPTION INTENSITY | Eb |
| COMMUNICATION QUALITY EVALUATION | BAD |
| RESULT OF TRANSMISSION | FAILURE |
| ROUTE INFORMATION #1 | |
| MAC ADDRESS | MAC ADDRESS OF NODE E |
| TIME INFORMATION | T2 |

Then, the inspection frame generation unit 31a transmits the route inspection frame 5n to the node E through the frame transmission unit 12. The inspection frame generation unit 31a notifies the judgment unit 33a of the time T2, and the judgment unit 33a measures the elapsed time from the time T2.

The procedure P46 is performed as follows. Assume that the route inspection frame 5n has reached the node E. In the node E, the route inspection frame 5n is processed similarly to the procedure P18. Furthermore, the operation of the node A when the Ack from the node E is received is similar to the procedure P19.

The procedure P47 is performed as follows. The inspection frame generation unit 31e of the node E requests the selection unit 32e to select the local destination to generate the route inspection frame 5p. In this case, the node E requests the selection unit 32e for the information about the link with the node A as the local transmission source of the route inspection frame 5n.

The selection unit 32e notifies the inspection frame generation unit 31e of the local destination of the route inspection frame 5p, and the information about the link between the node A and the node E by performing the process similar to the procedure P44. The inspection frame generation unit 31e generates the route inspection frame 5p using the information notified from the selection unit 32e, and transmits the frame to the node C.

The procedure P48 is performed as follows. Upon receipt of the route inspection frame 5p, the node C performs the process similar to the procedures P46 and P47. As a result, the route inspection frame 5q including the information about the link between the node E and the node C is transmitted to the node D.

The procedure P49 is performed as follows. Upon receipt of the route inspection frame 5q, the node D performs the process similar to the procedures P46 and P47. As a result, the route inspection frame 5r including the information about the link between the node C and the node D is transmitted to the node GW. The GW adds the information about the link between the node D and the GW to the information included in the route inspection frame 5r, and notifies the server 42 of the resultant information.

The method of analyzing the route information performed in the server 42 etc. is similar to the method according to the first embodiment. Also in the third embodiment, as described above with reference to the first and second embodiments, the state of a link may be monitored, a loop or backtracking in the route may be detected, etc.

Fourth Embodiment

To suppress the increase of the traffic in a network, to reduce the process load on a server side, etc., it is assumed that the number of pieces of route information to be included in one inspection frame may be reduced within a specified number. However, according to the first and second embodiments, when the route inspection frame 5 including the information that "transmission succeeded" is transmitted by assuming a successful transmission of the route inspection frame 5, there is the possibility that the inspection frame generation unit 31 may erroneously amend the information in the inspection frame.

FIG. 18 is an explanatory view of an example of a case in which route information is erroneously amended. In this case, it is assumed that when the inspection frame generation unit 31 of each node device 10 fails in the transmission of the route inspection frame 5, the route information added to the end of the transmitted route inspection frame 5 is set so that it may be automatically changed into "transmission failed".

Assume that the node X is to report to the GW the state of the route to the GW from the node X. Furthermore, it is assumed that the amount of data to be included in the route inspection frame 5 is limited.

The node X transmits the route inspection frame 5s to the node A as in the method described above with reference to the first embodiment. The route inspection frame 5s includes the information about the link between the node X and the node A, and the information that the communication from the node X to the node A has been successfully performed.

Upon receipt of the route inspection frame 5s from the node X, the node A transmits an Ack to the node X. Furthermore, the inspection frame generation unit 31a of the node A generates the route inspection frame 5 addressed to the node of the LD1 associated with the GW.

The inspection frame generation unit 31a judges whether or not the route information including the amount of data acquired from the selection unit 32a has exceeded the upper limit of the data to be included in the route inspection frame 5. If the route information including the amount of data acquired from the selection unit 32a has exceeded the upper limit, then the inspection frame generation unit 31a does not include the information about the link between the node A and the node B in the route inspection frame 5t addressed to the node B.

The node A waits for an Ack after transmitting the route inspection frame 5t to the node B. However, assume that the node A has failed in receiving the Ack before the elapse of the wait time Tw after the transmission of the route inspection frame 5t.

Then, the inspection frame generation unit 31a of the node A generates the route inspection frame 5u addressed to the node C. In this case, the inspection frame generation unit 31a changes the result of the transmission into "unsuccessful transmission" about the route information at the end of the route information included in the route inspection frame 5t. Therefore, the node A erroneously transmits to the node C the route inspection frame 5u including the information that the transmission has failed in the link between the node X and the node A.

Then, according to the fourth embodiment, "prohibition information" is added to the route inspection frame 5 to suppress the amount of route information to be included in one route inspection frame within a specified amount. The prohibition information refers to the prohibition of amendment to the route information included in the route inspection frame.

FIG. 19 is an example of a format of a route inspection frame 50. The route inspection frame 50 illustrated in FIG. 19 includes an ad hoc header, a security header, a data header, a data payload, a signature, and padding as with the route inspection frame 5. The data header includes a global destination address, a global transmission source address, a FID, an HTL, a data type, a transmission information, and a hop count.

The data type of the route inspection frame 50 includes a final route assignment flag. The value of 1 of the final route assignment flag indicates that there is no route information omitted to reduce the size of the route inspection frame 50 within a specified value. On the other hand, the value of 0 of the final route assignment flag indicates that there is route information omitted to reduce the size of the route inspection frame 50 within a specified value.

When there is omitted route information, the inspection frame generation unit 31 does not amend the route information to prevent the route information from being erroneously changed. That is, the value of 0 of the final route assignment flag is an example of prohibition information.

The data type further includes a route flag, an encryption flag, data type information, and a reserved area. The ad hoc header, the security header, the data payload, the signature, and the padding of the route inspection frame 50 are similar to those of the route inspection frame 5.

Figure 20:
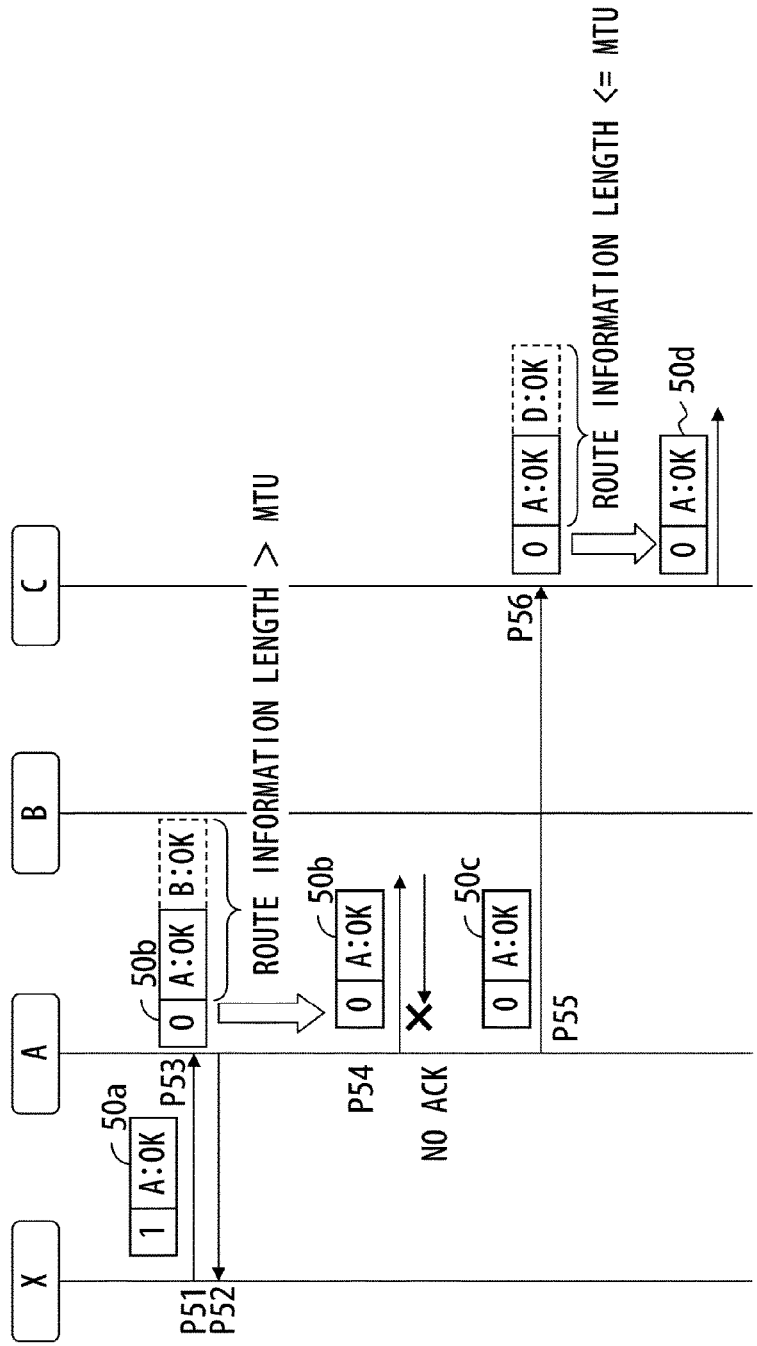
FIG. 20 illustrates a sequence of an example of a route inspecting method used according to the fourth embodiment of the present invention.

FIG. 20 illustrates a sequence of an example of a route inspecting method used according to the fourth embodiment of the present invention. FIG. 20 is an example of a communication performed in an ad hoc network in FIG. 18 when the route inspection frame 50 is used.

In the description below, it is assumed that the upper limit size of the route information which may be transmitted is a maximum transmission unit (MTU) set in the node device 10 which generates the route inspection frame 50. Furthermore, it is assumed that the MTU set in the node C is larger than the MTU set in the node A.

The procedure P51 is performed as follows. The node X transmits to the node A the route inspection frame 50a with the GW set as the global destination. In this case, the inspection frame generation unit 31x of the node X includes in the route inspection frame 50a the information about the link between the node X and the node A, and the information that the transmission from the node X to the node A has been successfully performed. The inspection frame generation unit 31x sets the final route assignment flag of the route inspection frame 50a to 1.

The procedure P52 is performed as follows. Assume that the route inspection frame 50a has been received by the node A. The node A transmits the Ack for the route inspection frame 50a to the node X by the process similar to the process described above with reference to the first embodiment.

The procedure P53 is performed as follows. In the node A, when the GW is the global destination and the node B is the LD1, the node A generates the route inspection frame 50b with the GW set as the global destination, and the node B set as the local destination.

The inspection frame generation unit 31a compares the calculated value of the size of the frame obtained by adding the information about the link between the node A and the node B to the route information included in the route inspection frame 50a with the upper limit size of the route information which may be transmitted. In this case, assume that the calculated value has exceeded the upper limit size of the route information which may be transmitted. Then, the inspection frame generation unit 31a sets the final route assignment flag of the route inspection frame 50b to 0 without including the information about the link between the node A and the node B.

The procedure P54 is performed as follows. The route inspection frame 50b generated in the procedure P53 is transmitted to the node B through the frame transmission unit 12a. The judgment unit 33a starts measuring the elapsed time from the transmission time of the route inspection frame 50b. The route inspection frame 50b stores the information that the transmission from the node X to the node A has been successfully performed and the information that the final route assignment flag is 0 as illustrated in FIG. 20.

The procedure P55 is performed as follows. Assume that the route inspection frame 50b was unable to be transmitted to the node B due to the degradation of the state of the link between the node A and the node B. In this case, the judgment unit 33a is unable to acquire the Ack for the route inspection frame 50b in the wait time Tw after the transmission of the route inspection frame 50b.

The process from the judgment of the unsuccessful transmission of the route inspection frame 50b to the acquisition of the information about the local destination of the new route inspection frame 50c from the selection unit 32a to the inspection frame generation unit 31a is similar to the process according to the first embodiment. Assume that the inspection frame generation unit 31a is notified of the node C as the local destination of the route inspection frame 50c.

The inspection frame generation unit 31a judges whether or not the route information may be added using the value of the final route assignment flag of the route inspection frame 50b. Since the final route assignment flag is 0 in the route inspection frame 50b, the inspection frame generation unit 31a judges that the route information is not to be changed.

In this case, the inspection frame generation unit 31a outputs the route inspection frame 50b to the forwarding unit 16 together with the local destination notified from the selection unit 32a. The forwarding unit 16 rewrites the ad hoc header of the route inspection frame 50b using the notified local destination, and sets the rewritten frame as the route inspection frame 50c. The route inspection frame 50c is transmitted to the node C.

The procedure P56 is performed as follows. Upon receipt of the route inspection frame 50c, the node C transmits the Ack for the route inspection frame 50c to the node A. Since the GW is set as the global destination of the route inspection frame 50c, the judgment unit 33c determines that a new route inspection frame 50d is to be generated. Assume that the node D is selected as the local destination of the route inspection frame 50d.

Thus, assume that the MTU set in the node C is larger than the MTU set in the node A. Therefore, it is assumed that although new route information is added to the route information included in the route inspection frame 50c, the MTU set in the node C is not exceeded.

On the other hand, since the final route assignment flag of the route inspection frame 50c is 0, the judgment unit 33c judges that the amendment to the route information is prohibited. If it is judged that the amendment to the route information is prohibited, then the inspection frame generation unit 31c outputs to the forwarding unit 16 the route inspection frame 50c and the information that the node D is the local destination. The forwarding unit 16c rewrites the local destination of the route inspection frame 50c to the node D, defines the rewritten frame as the route inspection frame 50d, and transmits the route inspection frame 50d to the node D through the frame transmission unit 12c.

In the procedure described above, the communication of the route inspection frame 50 is repeated until the frame including the route information reaches the GW. After setting the final route assignment flag to 0, the route information is not amended, thereby preventing wrong information from being notified to the GW. The method of processing the process notified to the GW is similar to the method according to the first embodiment.

Figure 21B:
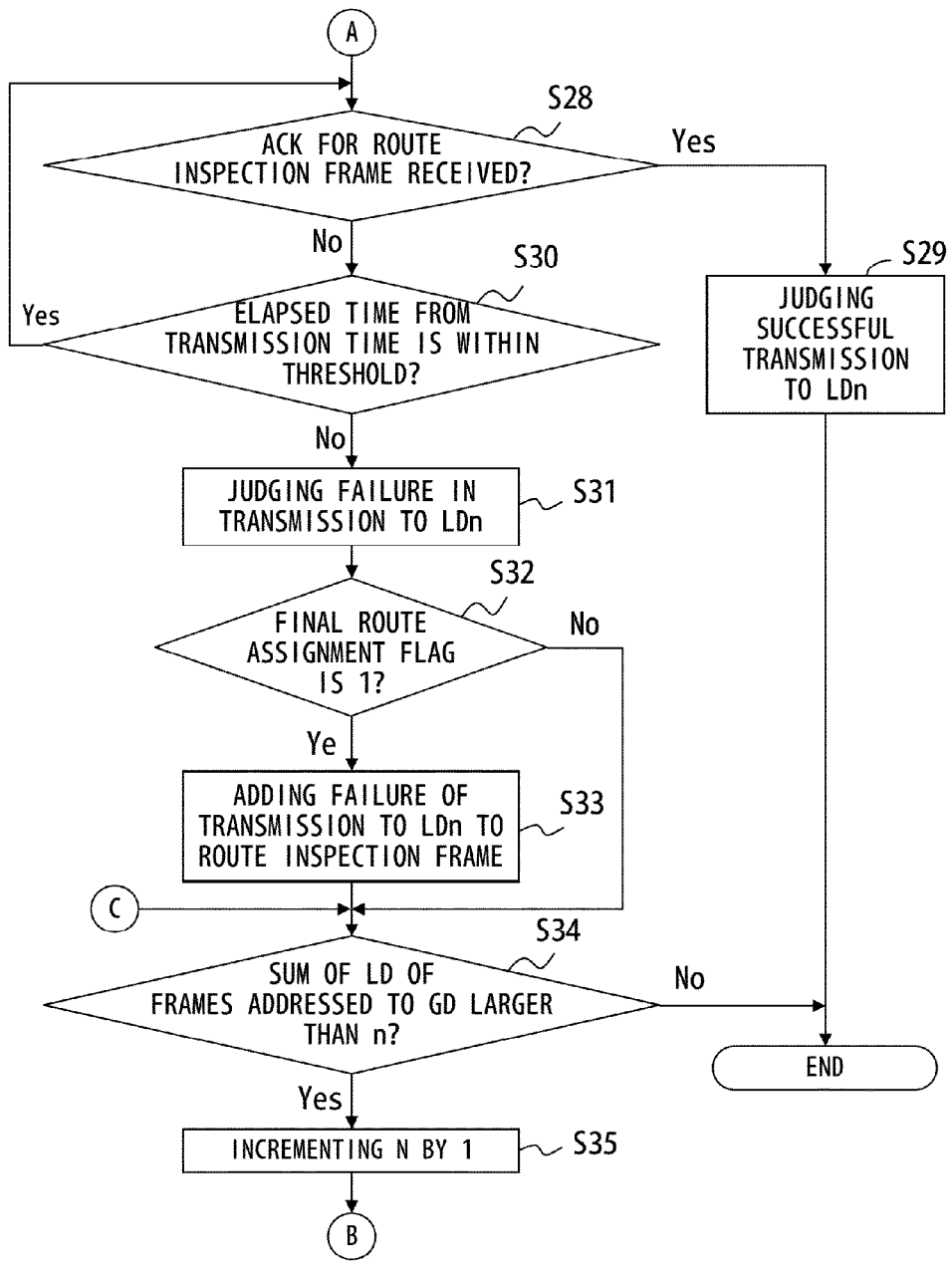

FIG. 21 is a flowchart for explanation of an example of an operation of a node device according to the fourth embodiment. The processes in steps S21 and S22 are similar to the processes in steps S1 and S2 described above with reference to FIG. 11A.

The inspection frame generation unit 31 judges whether or not the final route assignment flag has been set to 0 (step S23). The final route assignment flag included in the route inspection frame 50 received by the local node is to be processed. Since the route inspection frame 50 is not received in the node device 10 as the global transmission source of the route inspection frame 50, it is assumed that the final route assignment flag is 1, and is so processed.

When the final route assignment flag is 1 (NO in step S23), the inspection frame generation unit 31 judges whether or not new route information may be added (step S24). If route information may be newly added (YES in step S24), then the inspection frame generation unit 31 generates the route inspection frame 50 (step S25). Unless the route information may be newly added (NO in step S24), the inspection frame generation unit 31 sets the final route assignment flag to 0 (step S26). Afterwards, the route inspection frame 50 is transmitted to the LDn (step S27). The processes in steps S28 through S31 are similar to the processes in steps S5 through S8 in FIG. 11B.

When the transmission to the LDn is successful, the inspection frame generation unit 31 judges whether or not the final route assignment flag of the route inspection frame 50 to be transmitted has been set to 1 (step S32). Unless the final route assignment flag has been set to 1 (NO in step S32), the change of route information is prohibited, the inspection frame generation unit 31 does not change the route information about the route inspection frame 50. On the other hand, the final route assignment flag has been set to 1 (YES in step S32), the change of route information is not prohibited. Therefore, the inspection frame generation unit 31 generates the route inspection frame 50 with the information about the unsuccessful transmission to the LDn added to the route information (step S33).

The processes in steps S34 and S35 are similar to the processes in steps S10 and S11 in FIG. 11B. If it is judged that the information about the unsuccessful transmission of a frame to the LDn is recorded in the route information, the processes in and after step S34 are performed.

Others

The embodiments of the present invention are not limited to those described above, but may be varied variously. Some examples are described below.

The information elements etc. included in the formats and tables of the frame described above are examples only, and may be changed depending on the implementation.

In the description above, each node device 10 in the ad hoc network autonomously inspects the state of the route to the GW, but the node device 10 may inspect the route at a request. In this case, the operator monitors the state of access of the data from the ad hoc network using the server 42.

If the operator recognizes any problem such as that it takes a long time to acquire data from the node A, then the operator requests the GW through the server 42 to inspect the state of the route from the node A to the GW. At the request from the server 42, the GW requests the node A to inspect the state of the route from the node A to the GW. At the request from the GW, the inspection frame generation unit 31 of the node A generates the route inspection frame 5 with the global destination address assigned to the GW, thereby inspecting the route.

Furthermore, the global destination of the route inspection frame 5 or 50 may be the node device 10 other than the GW. In this case, the node device 10 set as the global destination forwards the route information included in the route inspection frame 5 or 50 toward the GW.

The case in which the upper limit size of the route information which may be transmitted is determined by the MTU is described above with reference to the fourth embodiment. However, the upper limit size of the route information which may be transmitted may be changed to another value depending on the implementation. Furthermore, the number of pieces of route information to be included in one route inspection frame 50 may be restricted. When the upper limit of the route information to be included in the route inspection frame 50 is set, the inspection frame generation unit 31 sets the number of pieces of information about the link included in the route inspection frame 50 as a value not more than the upper limit.

In the example above, the node device 10 may be a relay node or a meter. However, it is assumed that the ad hoc network is not limited to the network for inspecting a meter. In the embodiments above, the network may be a sensor network etc.

All examples and conditional language provided herein are intended for pedagogical purposes of aiding the reader in understanding the invention and the concepts contributed by the inventor to further the art, and are to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node device, comprising:
a transmitter which transmits an inspection frame used in inspecting a status of a route from a source node device of data to a destination node device of the data; and
a processor which
generates a first inspection frame used in inspecting the state of the route,
selects a first node device to which the transmitter transmits the first inspection frame from among candidates for a node device to which a frame addressed to the destination node device is to be forwarded,
judges whether or not a transmission of the first inspection frame has been successfully performed,
when the transmission of the first inspection frame from the transmitter has failed, generates a second inspection frame which records a failure in a communication with the first node device and which is used in inspecting the state of the route,
and selects a second node device to which the transmitter transmits the second inspection frame from among the candidates.

2. The device according to claim 1, wherein
the processor
includes, in the first inspection frame, information about a successful transmission to the first node device and a first evaluation value as an evaluation value of communication quality of a link with the first node device, and
includes, in the second inspection frame, the first evaluation value, information about an unsuccessful transmission to the first node device, a second evaluation value as an evaluation value of communication quality of a link with the second node device, and information about a successful transmission to the second node device.

3. The device according to claim 1, further comprising
a receiver which receives a frame from an adjacent node device, wherein
the processor
identifies a final destination node as a node device at a final destination of a route to be inspected in a reception frame which is the inspection frame received by the reception unit;
selects a third node device to which a third inspection frame is to be transmitted from among candidates for a node device to which a frame addressed to the final destination node is to be forwarded;
generates the third inspection frame which includes route information included in a received frame, and information about a link up to the third node device in a case where information about the third node is included in the received frame; and
the transmitter transmits the third inspection frame to the third node device.

4. The device according to claim 1, further comprising
a receiver which receives a frame from an adjacent node device, wherein:
the processor
identifies a final destination node which is a node device at a final destination of a route to be inspected in the received frame which is the inspection frame received in the reception unit;
selects a third node device to which a third inspection frame is to be transmitted from among the candidates for a node device to which a frame addressed to the final destination node is to be forwarded;
judges whether transmission of a frame to which information about a link with the third node device is added to route information included in the received frame is allowed using a size of route information included in the received frame;
when a transmission of the frame to which the information about the link with the third node device is added is not allowed, generates a frame, as the third inspection frame, which includes route information included in the received frames, and prohibition information which prohibits an amendment to route information; and
the transmitter transmits the third inspection frame to the third node device.

5. The device according to claim 4, wherein:
the processor
performs a process for forwarding a frame received by the receiver, wherein
when the third inspection frame has been unsuccessfully transmitted to the third node device, selects a fourth node device to which route information in the third inspection frame is to be transmitted from among the candidates for the node device to which a frame addressed to the final destination node is to be forwarded;
performs a process for forwarding the third inspection frame to the fourth node device; and
the transmitter transmits the third inspection frame to the fourth node device.

6. The device according to claim 1, further comprising
a receiver which receives a frame from an adjacent node device, wherein
the processor
identifies a third node device as an adjacent node device which has transmitted a received frame as an inspection frame received by the receiver, and
generates a third inspection frame including information about a success of a communication with the third node device and an evaluation value of communication quality of a link with the third node device;
selects a fourth node device as a destination of the third inspection frame from among the candidates for a node device to which a frame addressed to the destination node device is to be forwarded; and
the transmitter transmits the third inspection frame to the fourth node device.

7. A communication method executed by a first node device in a network including a plurality of node devices, comprising:
selecting a second node device to which a first inspection frame used in inspecting the route is transmitted from among candidates for a node device to which a frame addressed to a final destination node is forwarded, the final destination node being a node device at a final destination of a route whose communication quality is to be inspected;
generating a second inspection frame storing information that the first node device has failed in a communication between the first node device and the second node device when a transmission of a first inspection frame to the second node device fails;
selecting a third node device to which the second inspection frame is to be transmitted from among the candidates; and
notifying the final destination node through the third node device that a communication between the first node device and the second node device has failed by transmitting the second inspection frame to the third node device.

8. A non-transitory computer-readable recording medium having stored therein program for causing a first node device in a network including a plurality of node devices to execute a process comprising:

selecting a second node device to which a first inspection frame used in inspecting a route is to be transmitted from among candidates for a node device to which a frame addressed to a final destination node is forwarded, the final destination node being a node device at a final destination of the route whose communication quality is to be inspected;

generating a second inspection frame storing information that a communication between the first node device and the second node device has failed when a transmission of a first inspection frame to the second node device has failed;

selecting a third node device to which the second inspection frame is to be transmitted from among the candidates; and notifying the final destination node through the third node device that a communication between the first node device and the second node device has failed by transmitting the second inspection frame to the third node device.

9. A network system, comprising:

a network including a plurality of node devices, wherein a first node device in the network selects a second node device to which a first inspection frame used in inspecting the route is to be transmitted from among candidates for a node device to which a frame addressed to a final destination node is to be forwarded, wherein the final destination node is a node device at a final destination of the route whose communication quality is to be inspected, generating a second inspection frame storing information that a communication between the first node device and the second node device has failed when a transmission of a first inspection frame to the second node device fails;

selecting a third node device to which the second inspection frame is to be transmitted from among the candidates; and notifying the final destination node through the third node device that a communication between the first node device and the second node device has failed by transmitting the second inspection frame to the third node device.

* * * * *